(12) United States Patent
Kimata

(10) Patent No.: US 7,327,990 B2
(45) Date of Patent: Feb. 5, 2008

(54) RECEPTION DIVERSITY SYSTEM AND CONTROL METHOD THEREFOR

(75) Inventor: Yusuke Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 11/110,891

(22) Filed: Apr. 21, 2005

(65) Prior Publication Data

US 2005/0239424 A1 Oct. 27, 2005

(30) Foreign Application Priority Data

Apr. 23, 2004 (JP) .............................. 2004-128217

(51) Int. Cl.
*H04Q 7/00* (2006.01)

(52) U.S. Cl. .................. 455/101; 455/115.1; 455/130; 455/226.1

(58) Field of Classification Search ................ 455/101, 455/114.2, 115.1, 130, 131, 135, 141, 226.1, 455/269, 334
See application file for complete search history.

(56) References Cited

U.S. PATENT DOCUMENTS 5,594,943 A * 1/1997 Balachandran .............. 455/436

6,434,395 B1 * 8/2002 Lubin et al. ................ 455/466

FOREIGN PATENT DOCUMENTS

JP 06-188790 A 7/1994

* cited by examiner

*Primary Examiner*—Tony T. Nguyen
*Assistant Examiner*—Thuan T. Nguyen
(74) *Attorney, Agent, or Firm*—Sughrue Mion, PLLC

(57) ABSTRACT

In a reception diversity system, a wireless apparatus includes an RF unit, analog signal processing unit, digital signal processing unit, and a control unit which controls the RF unit. The control unit operates only a predetermined system of systems while stopping the remaining systems for at least each intermittent operation period in intermittent reception operation of the RF unit, and stops all the systems in an intermittent stop period in the intermittent reception operation. The digital signal processing unit sets, in the RF unit, an initial reception gain estimated from an arbitrary past reception gain used in a past intermittent operation period as a first reception gain in a new system which is operated in accordance with arrival of a next intermittent operation period, thereby performing switching control of a plurality of systems which respectively demodulate received radio waves, and obtaining desired reception data. A control method for a reception diversity system is also disclosed.

68 Claims, 16 Drawing Sheets

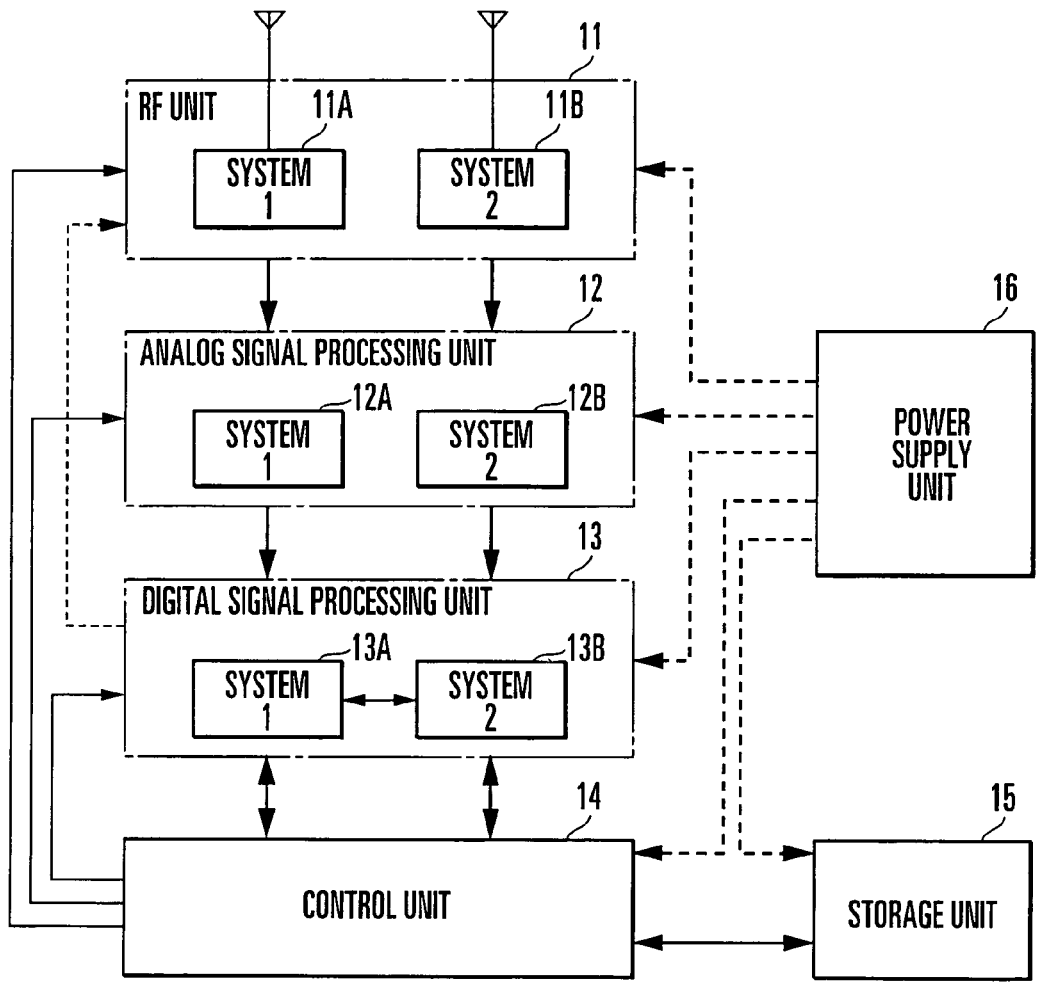
F I G. 1

RECEPTION DIVERSITY SYSTEM AND CONTROL METHOD THEREFOR

BACKGROUND OF THE INVENTION

The present invention relates to a wireless communication technique and, more particularly, to a control technique for a reception diversity system which obtains desired reception data by performing switching control of a plurality of systems which individually demodulate reception waves.

A wireless terminal such as a cellular phone terminal receives, as radio waves transmitted from a wireless apparatus such as a base station, not only direct waves which are directly sent from the base station to the wireless terminal but also reflected waves which are sent to the wireless terminal upon being reflected by obstacles such as buildings.

In this case, since a reflected wave differs from a direct wave in propagation distance, even if they are radio waves transmitted from the base station at the same timing, they are received by the wireless terminal at different timings. As a consequence, these radio waves interfere with each other to cause a phenomenon in which radio waves received by the wireless terminal repeatedly vary in strength in predetermined cycles, i.e., fading.

In order to suppress the influence of such fading, a reception diversity system has been widely used and incorporated in a wireless terminal.

FIG. 17 shows an example of the arrangement of a conventional reception diversity system. This reception diversity system includes an RF unit 11, analog signal processing unit 12, digital signal processing unit 13, control unit 14, storage unit 15, and power supply unit 16.

The RF unit 11 demodulates reception waves from the respective antennas, for each of systems 1 to N, and outputs analog reception signals. The analog signal processing unit 12 A/D-converts the analog reception signals from the RF unit 11, and outputs the resultant signals as digital reception signals for each of systems 1 to N. The digital signal processing unit 13 decodes and combines the digital reception signals from the analog signal processing unit 12 for each of systems 1 to N, and outputs the resultant information as reception information. The digital signal processing unit 13 also adjusts the reception gain of the RF unit 11 for each of systems 1 to N on the basis of the result of level calculation performed for each systems 1 to N.

The control unit 14 issues operation instructions to the RF unit 11, analog signal processing unit 12, and digital signal processing unit 13 for each of systems 1 to N on the basis of the reception information from the digital signal processing unit 13. The storage unit 15 stores various kinds of information necessary for control processing by the control unit 14. The power supply unit 16 supplies power necessary for the operations of the RF unit 11, analog signal processing unit 12, digital signal processing unit 13, control unit 14, and storage unit 15.

As described above, in the conventional reception diversity system, the RF unit 11, analog signal processing unit 12, and digital signal processing unit 13 each are provided in parallel with a plurality of systems 1 to N which process reception waves. In this arrangement, a plurality of reception signals obtained from systems 1 to N are combined or switched to improve the reception quality of reception waves, e.g., SNR (Signal to Noise Ratio) or SIR (Signal to Interference Ratio) or suppress variations in the level of reception waves to stabilize them, thereby suppressing the influence of fading.

As shown in FIG. 18, in such a reception diversity system, for example, during standby time, systems 1 to N are made to intermittently perform reception operation in synchronism with each other to adjust the reception gain of each system, thereby improving the overall reception quality obtained by combining reception signals from the respective systems. Consequently, power consumption increases with an increase in the number of systems. If, therefore, a conventional reception diversity system is incorporated in a wireless terminal powered by a secondary battery, e.g., a cellular phone terminal, the consumption of the secondary battery is higher than that of a terminal without a reception diversity system. As a consequence, the period in which the wireless terminal can be used by the secondary battery, e.g., a speech communication time and standby time, is greatly reduced.

In order to suppress such power consumption, in a conventional reception diversity system, there is conceivable a method of operating only one of a plurality systems while stopping the remaining systems in each intermittent reception period in intermittent reception operation, e.g., a standby time, and stopping all the systems in an intermittent stop period.

In a conventional reception diversity system, however, if only one of a plurality of systems is operated while the remaining systems are stopped in each intermittent operation period, the essential function required for the reception diversity system cannot be effectively used.

In a conventional reception diversity system, when, for example, the operation of a system which is not selected is simply stopped, the system cannot grasp variations in reception level during an intermittent stop period, and hence uses a reception gain which is permanently determined in advance at the time of resumption of reception operation in the next intermittent operation period. This makes it impossible to properly adjust the reception gain while following up the above variations in reception level.

In addition, in a conventional reception diversity system, when only one of the systems is operated in an intermittent operation period while the remaining systems are stopped, total reception quality such as an SNR or SIR value obtained when all the systems are concurrently operated, and the resultant reception signals are combined cannot be grasped. This makes it impossible to properly perform reception control such as cell switching determination in a wireless telephone system, and hence it is impossible to obtain merits derived from the reception diversity system, e.g., an improvement in reception quality.

SUMMARY OF THE INVENTION

It is, therefore, a principal object of the present invention to provide a reception diversity system and its control method which can effectively use an essential function of the reception diversity system while suppressing power consumption in intermittent reception operation.

In order to achieve the above object, according to the present invention, there is provided a reception diversity system comprising a wireless apparatus including an RF unit which amplifies radio waves respectively received by antennas with reception gains respectively set for systems and demodulates the radio waves to output analog reception signals, an analog signal processing unit which A/D-converts the respective analog reception signals from the RF unit for the respective systems and outputs the signals as digital reception signals, a digital signal processing unit which decodes and combines the respective digital reception signals from the analog signal processing unit to output desired reception information, sequentially adjusts a reception gain of each system in the RF unit on the basis of a reception level of each of the digital reception signals, and stores an arbitrary reception gain used for the adjustment, and a control unit which controls the RF unit, the analog signal processing unit, and the digital signal processing unit, wherein the control unit operates only a predetermined system of the respective systems while stopping the remaining systems for at least each intermittent operation period in intermittent reception operation of the RF unit, and stops all the systems in an intermittent stop period in the intermittent reception operation, and the digital signal processing unit sets, in the RF unit, an initial reception gain estimated from an arbitrary past reception gain used in a past intermittent operation period as a first reception gain in a new system which is operated in accordance with arrival of a next intermittent operation period, thereby performing switching control of a plurality of systems which respectively demodulate received radio waves, and obtaining desired reception data.

BRIEF DESCRIPTION OF THE DRAWINGS

FIG. 1 is a block diagram showing the arrangement of a reception diversity system according to the first embodiment of the present invention;

DESCRIPTION OF THE PREFERRED EMBODIMENTS

Figure 2:
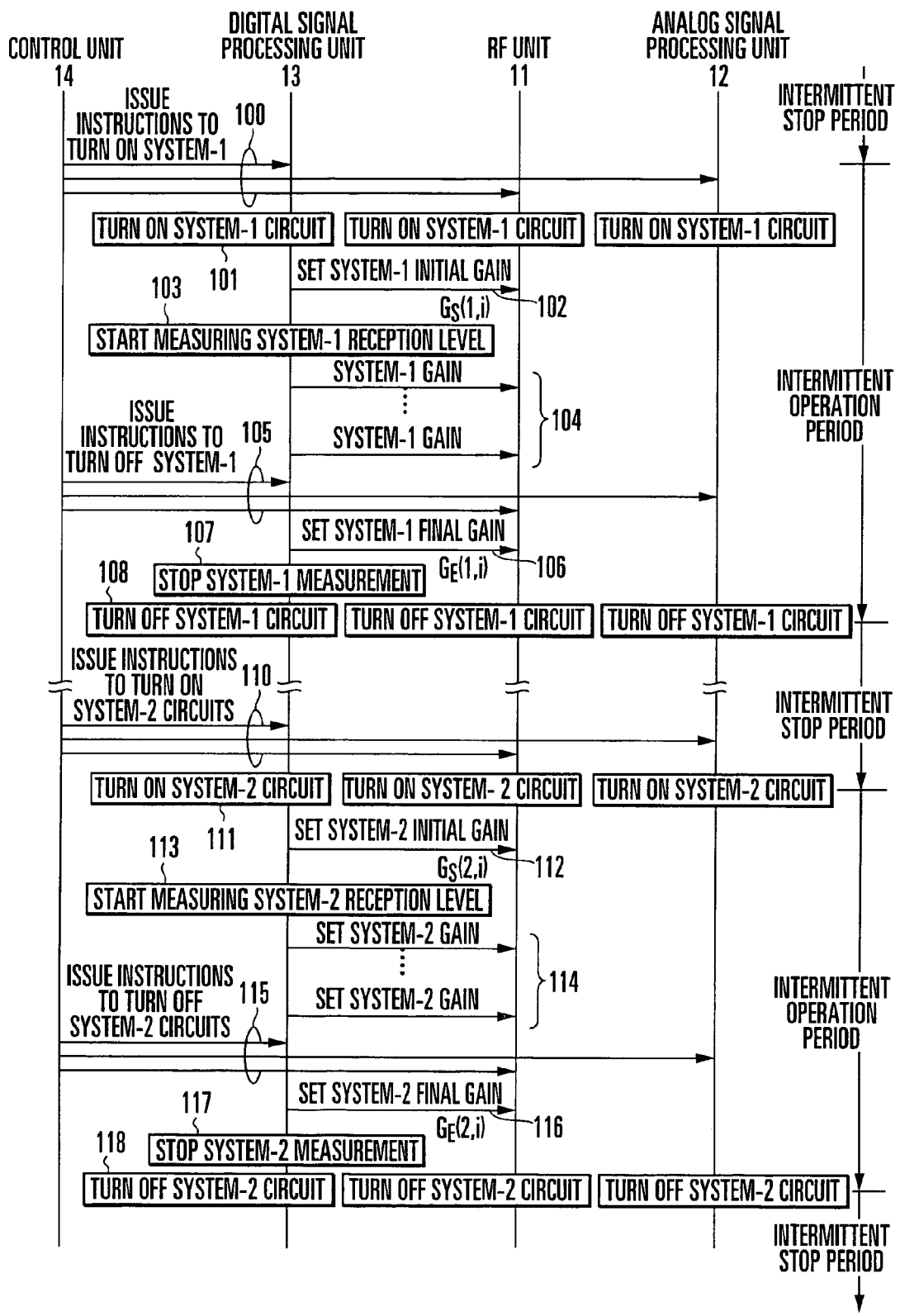
FIG. 2 is a view showing a sequence indicating the intermittent reception operation of the reception diversity system according to the first embodiment of the present invention.

The embodiments of the present invention will be described next with reference to the accompanying drawings.

[First Embodiment]

A reception diversity system according to the first embodiment of the present invention will be described first with reference to FIG. 1.

The reception diversity system shown in FIG. 1 is a reception control system to be incorporated in a wireless terminal (wireless apparatus) such as a cellular phone terminal so as to suppress the influence of fading on reception waves. This system includes a plurality of systems which receive and demodulate reception waves. Reception signals obtained from these systems are combined or switched to suppress variations in the reception quality or level of reception waves, thereby stabilizing the reception waves.

This embodiment is directed to operate only one of the systems in only an intermittent reception operation time while stopping the remaining systems in the reception diversity system, thereby suppressing power consumption in each system and avoiding a reduction in time during which the wireless terminal can be operated on a secondary battery, e.g., a speech communication time or standby time.

In addition, when reception operation is resumed by an arbitrary system, the initial reception gain estimated from the reception gain used in past reception operation in the arbitrary system is used as a reception gain in the operation resumption time.

[Arrangement of Reception Diversity System]

The arrangement of the reception diversity system according to this embodiment will be described next with reference to FIG. 1.

This reception diversity system includes an RF unit 11, analog signal processing unit 12, digital signal processing unit 13, control unit 14, storage unit 15, and power supply unit 16. This embodiment is provided with, for example, two systems serving as systems which obtain reception data by demodulating reception waves.

The RF unit 11 is a circuit unit which includes a system-1 circuit 11A and system-2 circuit 11B for the respective systems and outputs analog reception signals by demodulating reception waves from the respective antennas through the circuits 11A and 11B for the respective systems.

The analog signal processing unit 12 is a circuit unit which includes a system-1 circuit 12A and system-2 circuit 12B for the respective systems, A/D-converts the analog reception signals from the RF unit 11 through the circuits 12A and 12B for the respective systems, and outputs the resultant signals as digital reception signals.

The digital signal processing unit 13 is a functional unit which includes a system-1 circuit 13A and system-2 circuit 13B comprising signal processing circuits such as DSPs for the respective systems. This unit decodes and combines the digital reception signals from the analog signal processing unit 12 through the circuits 13A and 13B for the respective systems, and outputs the resultant information as reception information. The unit then calculates reception quality, e.g., an SNR (Signal to Noise Ratio) or SIR (Signal to Interference Ratio), obtained when the reception signals obtained by the respective systems are combined, and stores/holds it. In addition, the unit adjusts the reception gains of the circuits 11A and 11B for the respective systems of the RF unit 11, and stores/holds the adjusted gains. Note that a memory which stores and holds reception quality and reception gains may be provided in the digital signal processing unit 13, or a memory outside the digital signal processing unit 13 may be used.

The control unit 14 is a functional unit which comprises a microprocessor such as a CPU and its peripheral circuits. This unit executes predetermined programs to implement the respective types of functional means by cooperation between the above hardware and the programs, thereby performing control to issue intermittent reception operation instructions to the circuits of the respective systems provided in the RF unit 11, analog signal processing unit 12, and digital signal processing unit 13, and performing various kinds of control on the reception diversity system and wireless terminal.

The storage unit 15 comprises a storage device such as a memory, which stores various kinds of information and programs necessary for control processing by the control unit 14.

The power supply unit 16 is a circuit unit which supplies power necessary for operation to the RF unit 11, analog signal processing unit 12, digital signal processing unit 13, control unit 14, and storage unit 15 by using a power supply such as a secondary battery.

Note that the RF unit 11, analog signal processing unit 12, digital signal processing unit 13, and control unit 14 have functions of processing transmission signals. However, a description of such functions will be omitted because the present invention is associated with reception operation.

[Operation of Reception Diversity System]

The intermittent reception operation of the reception diversity system according to the first embodiment of the present invention will be described with reference to FIGS. 2 and 3.

FIG. 2 shows the intermittent reception operation of the reception diversity system according to the first embodiment of the present invention. FIG. 3 shows a reception gain calculation method in the reception diversity system according to the first embodiment of the present invention. In this case, as an initial reception gain at the time of the resumption of reception operation in intermittent reception operation, the reception gain set last in a system which has operated in the immediately preceding operation time, i.e., the final set gain, is used.

Figure 19:
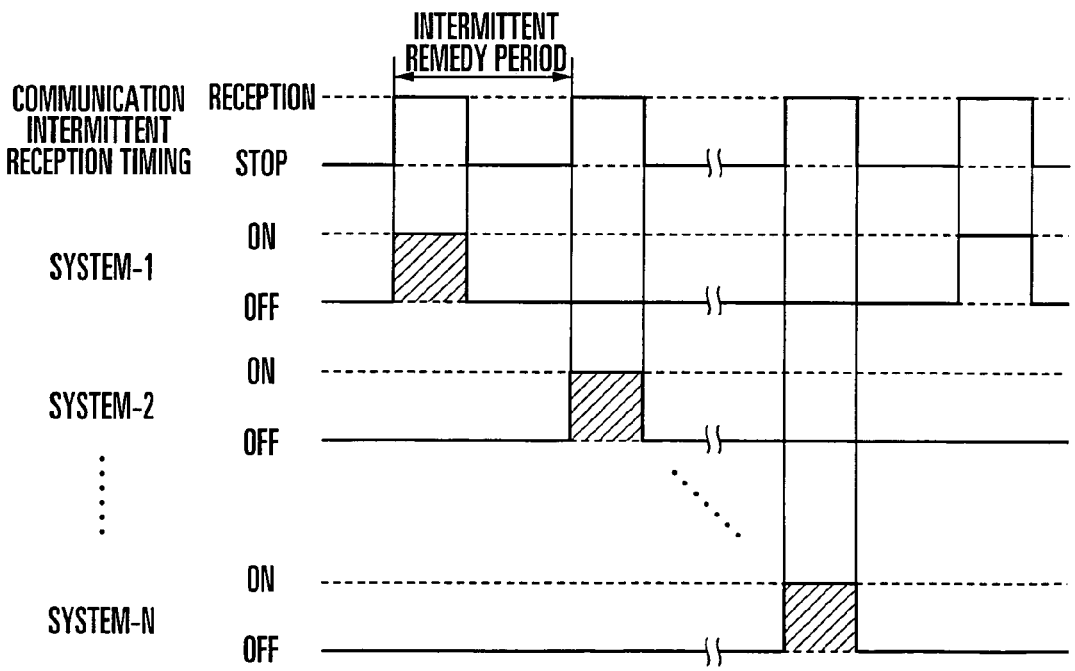
FIG. 19 is a timing chart showing another example of the intermittent reception operation of the reception diversity system.

The control unit 14 performs intermittent reception operation of operating only one of a plurality of systems while stopping the remaining systems in a standby time in which the wireless terminal is not used for speech communication or communication, as shown in FIG. 19 described above.

First of all, the control unit 14 sends instructions to the RF unit 11, analog signal processing unit 12, and digital signal processing unit 13 to turn on the system-1 circuits 11A, 12A, and 13A in accordance with the arrival of an intermittent reception period of system 1 (step 100).

In response to these instructions, the RF unit 11, analog signal processing unit 12, and digital signal processing unit 13 turn on the system-1 circuits 11A, 12A, and 13A, respectively, and operate them (step 101).

The digital signal processing unit 13 causes the system-1 circuit 13A to read out a final set gain $G_E(2, i-1)$ which has been used in the previous intermittent operation period of the system-2 circuit 11B of the RF unit 11 and stored/held, and sets it as an initial reception gain $G_S(1, i)$ for the system-1 circuit 11A of the RF unit 11 (step 102).

In this case, "2" of $G_E(2, i-1)$ represents the number of the system, and "i−1" represents the number of intermittent operation in the system of interest. This applies to $G_S(1, i)$; "1" represents the number of the system, and "i" represents the number of intermittent operation in the system of interest.

Subsequently, the digital signal processing unit 13 causes the system-1 circuit 13A to start measuring the reception level of a system-1 digital reception signal received through the system-1 circuit 11A of the RF unit 11 and the system-1 circuit 12A of the analog signal processing unit 12 (step 103).

The system-1 circuit 13A calculates a gain to be set in the system-1 circuit 11A of the RF unit 11 on the basis of the level measurement result, and sets the gain in the system-1 circuit 11A of the RF unit 11. The system-1 circuit 13A repeatedly performs this operation in an intermittent operation period (step 104).

In this case, for example, gain calculation may be performed by the following method. If the level measurement result on a digital reception signal is lower than the level required for the system-1 circuit 13A of the digital signal processing unit 13 by X dB, the gain to be set in the system-1 circuit 11A of the RF unit 11 is increased by X dB. If the measurement result is higher than the above level by X dB, the gain to be set in the system-1 circuit 11A of the RF unit 11 is decreased by X dB.

Subsequently, the control unit 14 sends instructions to the RF unit 11, analog signal processing unit 12, and digital signal processing unit 13 to turn off the system-1 circuits 11A, 12A, and 13A, respectively, in accordance with the arrival of an intermittent stop period of system 1 (step 105).

In accordance with this operation, the system-1 circuit 13A of the digital signal processing unit 13 stores/holds $G_E(1, i)$ as the final set gain set in the system-1 circuit 11A of the RF unit 11 in step 106, and stops reception level measurement (step 107).

The RF unit 11, analog signal processing unit 12, and digital signal processing unit 13 then turn off the system-1 circuits 11A, 12A, and 13A to stop their operations (step 108).

The control unit 14 then sends instructions to the RF unit 11, analog signal processing unit 12, and digital signal processing unit 13 to turn on the system-2 circuits 11B, 12B, and 13B, respectively, in accordance with the arrival of an intermittent operation period of system 2 (step 110).

In accordance with the instructions, the RF unit 11, analog signal processing unit 12, and digital signal processing unit 13 turn on the system-2 circuits 11B, 12B, and 13B, respectively, to operate them (step 111).

The digital signal processing unit 13 causes the system-2 circuit 13B to set the final set gain $G_E(1, i)$, which was used for the previous operation by the system-1 circuit 11A of the RF unit 11, as an initial reception gain $G_S(2, i)$ for the system-2 circuit 11B of the RF unit 11 (step 112).

The digital signal processing unit 13 then causes the system-2 circuit 13B to start measuring the reception level of the system-2 digital reception signal received through the system-2 circuit 11B of the RF unit 11 and the system-2 circuit 12B of the analog signal processing unit 12 (step 113).

The system-2 circuit 13B calculates a gain to be set in the system-2 circuit 11B of the RF unit 11 on the basis of the level measurement result, and sets the gain in the system-2 circuit 11B of the RF unit 11. The system-2 circuit 13B repeatedly performs this operation in an intermittent operation period (step 114).

Subsequently, the control unit 14 sends instructions to the RF unit 11, analog signal processing unit 12, and digital signal processing unit 13 to turn off the system-2 circuits 11B, 12B, and 13B, respectively, in accordance with the arrival of an intermittent stop period of system 2 (step 115).

In accordance with this operation, the system-2 circuit 13B of the digital signal processing unit 13 stores/holds $G_E(2, i)$ as the final set gain set in the system-2 circuit 11B of the RF unit 11 in step 116, and stops reception level measurement (step 117).

The RF unit 11, analog signal processing unit 12, and digital signal processing unit 13 then turn off the system-2 circuits 11B, 12B, and 13B to stop their operations (step 118). The intermittent operation period then shifts to an intermittent stop period, and the above intermittent reception operation is repeatedly performed.

Presented below as equation (1) is a generalized equation for estimating an initial reception gain in this embodiment. In this case, $G_S(\ )$ represents an initial reception gain; $G_E(\ )$, a final set gain; n, a system number; i, an intermittent operation number in a new system; and j, an intermittent operation number in a system which has operated in the immediately preceding period. Assuming that the respective systems operate in ascending order of system numbers, and when the system number becomes 0, a system count N (N is an integer of 2 or more) is cyclically used as n.

$$G_S(n, i) = G_E(n-1, j) \quad (1)$$

Although control for two intermittent reception periods has been described with reference to FIGS. 2 and 3, the operation in each intermittent reception period is the same as that described below. For example, as shown in FIG. 3, when reception operation in system 1 is to be resumed after reception operation in system 2 is stopped, the final set gain $G_E(2, i)$ in system 2 may be used as the initial reception gain $G_S(1, i+1)$ in system 1. A detailed description of this operation will be omitted.

Figure 3:
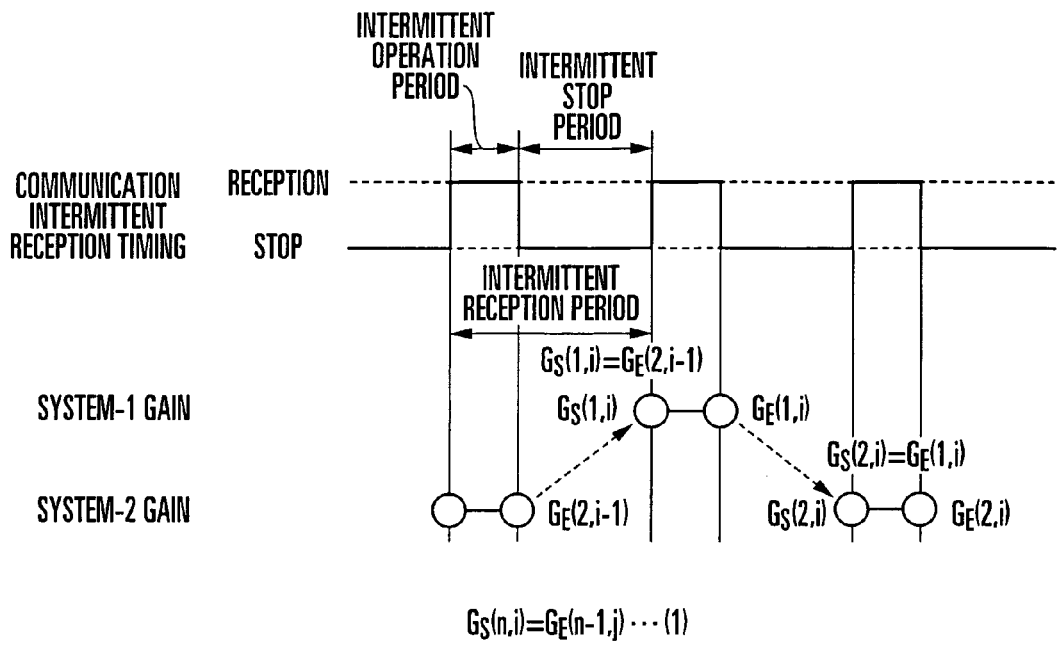
FIG. 3 is a chart for explaining a reception gain calculation method in the reception diversity system according to the first embodiment of the present invention.
Figure 4:
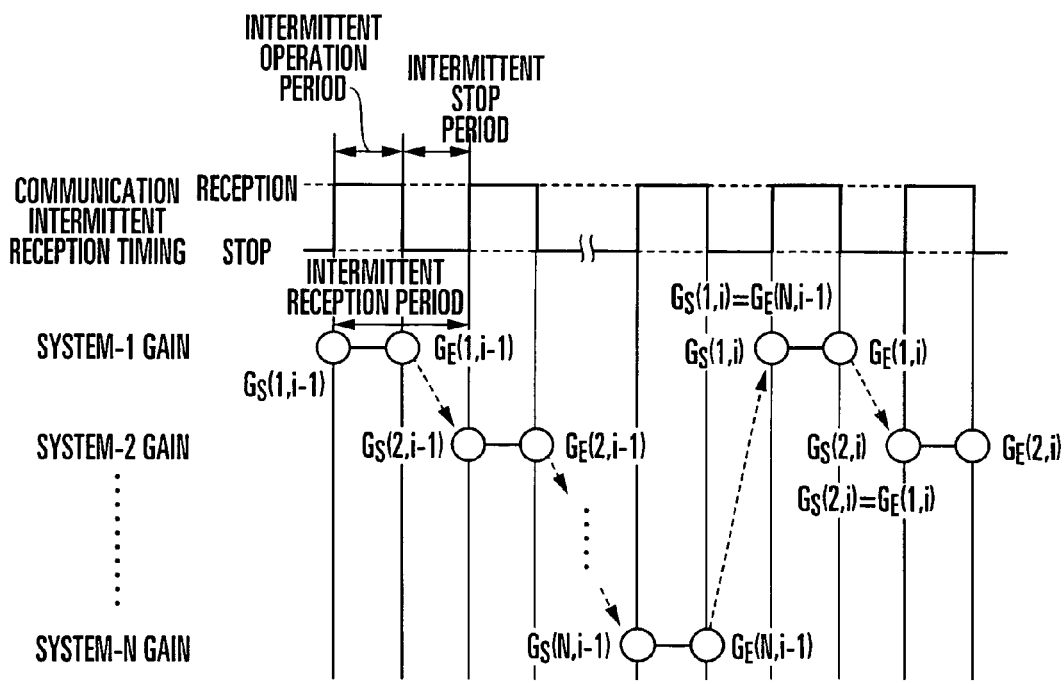
FIG. 4 is a chart for explaining another reception gain calculation method in the reception diversity system according to the first embodiment of the present invention.

In addition, operation in two systems has been described as an example with reference to FIGS. 2 and 3. However, the same applies to a case wherein the number of systems is three or more. FIG. 4 shows another reception gain calculation method in the reception diversity system according to the first embodiment of the present invention. When, for example, systems 1 to N (N is an integer of 3 or more) are to be sequentially operated one by one, the last reception gain used in a system which has operated immediately preceding period may be used as its initial reception gain.

As described above, in the reception diversity system, in intermittent reception operation in which only one of a plurality of systems is operated while the remaining systems are stopped, when operation in an arbitrary system is to be resumed, the initial reception gain estimated on the basis of the reception gain used in a past intermittent operation period is used as a reception gain in the operation resumption time. With this operation, even if the reception level varies while a system whose operation is to be resumed is stopped, the reception gain can be adjusted following up the variations in reception level, unlike, for example, a case wherein a permanently determined reception gain is always used as an initial reception gain.

Therefore, the power consumption in each system can be suppressed to avoid a reduction in time during which the wireless terminal can be operated on a secondary battery, e.g., a reduction in speech communication time or standby time. In addition, this makes it possible to effectively use the essential function required for the reception diversity system, i.e., a follow-up function for reception level variations.

In addition, as an initial reception gain to be set when operation in an arbitrary system is to be resumed, the past reception gain used in one of the respective systems which has operated in the immediately preceding intermittent operation period is used. This makes it possible to realize high-accuracy reception gain adjustment in consideration of latest reception level variations temporally close to the intermittent reception operation to be resumed.

Furthermore, as a past reception gain, the reception gain set last in the system which has operated in an intermittent operation period of interest, i.e., the final set gain, is used. This allows the use of a reception level in an intermittent operation period in which reception gain follow-up control is sufficiently done, and hence can follow up reception level variations with high accuracy.

This embodiment has exemplified the case wherein as an initial reception gain to be set at the time of the resumption of reception operation in intermittent reception operation, the reception gain set last in a system which has operated in the immediately preceding period, i.e., the final set gain, is used. However, the present invention is not limited to this. As this initial reception gain, any reception gain can be used as long as it is estimated from the reception gain used in past reception operation in an arbitrary system.

For example, the reception gain used in the past in a new system whose reception operation is to be resumed in the next intermittent operation period may be used as an initial reception gain. More specifically, an arbitrary reception gain used in the new system in the previous intermittent operation period, or the final set gain used in the previous intermittent operation period, may be used. This makes it possible to use a reception level in the same system temporally close to the intermittent reception operation to be resumed and adjust the reception gain while following up reception level variations quickly and accurately.

[Second Embodiment]

A reception gain calculation method in a reception diversity system according to the second embodiment of the present invention will be described next with reference to FIG. 5. Note that the arrangement and intermittent reception operation of the reception diversity system according to this embodiment are the same as those of the first embodiment (see FIGS. 1 and 2), and a description thereof will be omitted.

In the first embodiment described above, as an initial reception gain in a system whose reception operation is to be resumed in intermittent reception operation, the reception gain used in a past intermittent operation period is used without any change.

This embodiment will exemplify a case wherein a digital signal processing unit 13 uses, as an initial reception gain, the statistics value calculated from a plurality of past reception gains.

As a statistics value in this embodiment, a cumulative reception gain may be used, which is obtained by weighting past reception gains respectively representing a plurality of past intermittent operation periods in an arbitrary system and totaling the resultant values.

Figure 5:
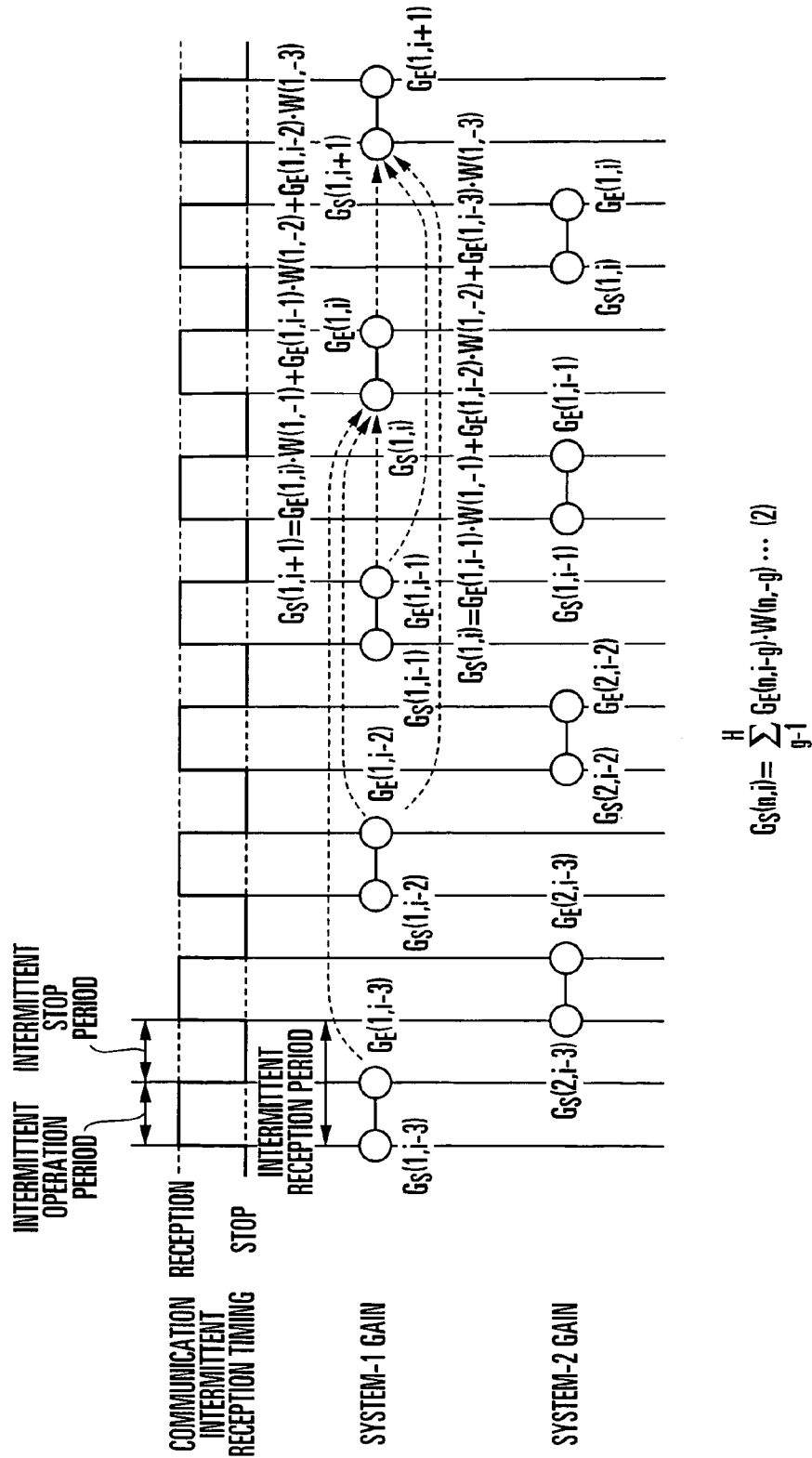
FIG. 5 is a chart for explaining a reception gain calculation method in a reception diversity system according to the second embodiment of the present invention.

FIG. 5 shows a case wherein an initial reception gain is estimated by using past reception gains in a new system whose reception operation is to be resumed, the final set gains are used as past reception gains representing the respective intermittent operation periods, and a cumulative count H of such final set gains is 3.

For example, for the initial reception gain $G_S(1, i)$ at the intermittent operation number i in system 1, final set gains $G_E(1, i-1)$ to $G_E(1, i-3)$ respectively used in intermittent operation periods one to three periods ahead of the current period are multiplied by weights $W(1, -1)$ to $W(1, -3)$, and the resultant values are totaled, thereby calculating a cumulative reception gain.

Note that "1" of the weight $W(1, -1)$ is a system number, and "−1" is an intermittent operation period count by which the intermittent operation period in which the initial reception gain is to be calculated is tracked back. The weight W indicates the degree of influence on each final set gain $G_E$ with respect to the initial reception gain. By setting the total sum of W to 1 or less, a cumulative reception gain having the same variation width (span) as that of a reception gain can be obtained.

Presented below as equation (2) is a generalized equation for estimating an initial reception gain in this embodiment. In this case, $G_S( )$ represents an initial reception gain; $G_E( )$, a final set gain; $W( )$, a weight; n, a system number; i, an intermittent operation number in each system; H, a cumulative count of final set gains; and g, a variable indicating the cumulative count H. In general, a lager value is used as the weight W for an intermittent operation period temporally closer to an initial reception gain. Equation (2) can be regarded as a moving average calculation expression using the weight W as a forgetting factor.

$$G_S(n, i) = \sum_{g=1}^{H} G_E(n, i-g) \cdot W(n, -g) \qquad (2)$$

As described above, as an initial reception gain in a system whose reception operation is to be resumed in intermittent reception operation, the statistics value calculated from a plurality of past reception gains used in past intermittent operation periods is used. Even if any of the past gains greatly varies temporarily, the influence of the variation on the initial reception gain can be suppressed, thereby realizing stable reception gain adjustment.

In addition, since reception gains representing the respective intermittent operation periods, e.g., the final set gains, are used as the past reception gains, reception levels are used in a state wherein reception gain follow-up control is sufficiently performed within the respective intermittent operation periods, and accurate follow-up operation can be realized with respect to reception level variations.

This embodiment has exemplified the case wherein an initial reception gain is estimated by using past reception gains in a new system whose reception operation is to be resumed. However, the present invention is not limited to this, and past reception levels in another system may be used. For example, using past reception gains in a system which has operated in the immediately preceding intermittent operation period makes it possible to realize accurate reception gain adjustment in consideration of latest reception level variations temporally close to the intermittent reception operation to be resumed while suppressing the influence of reception gain variations.

[Third Embodiment]

Figure 6:
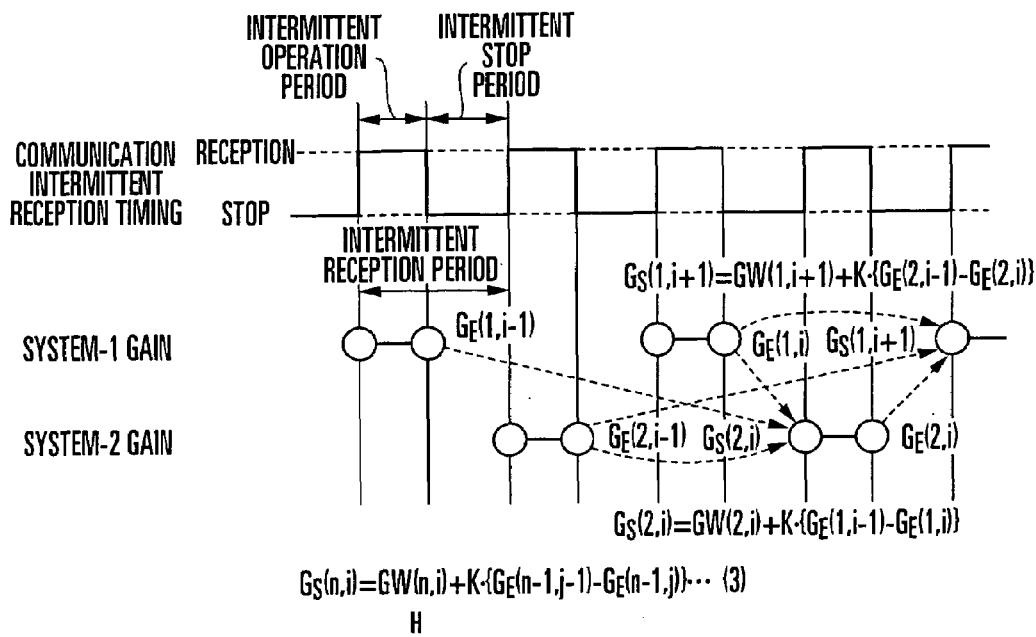
FIG. 6 is a chart for explaining a reception gain calculation method in a reception diversity system according to the third embodiment of the present invention.
Figure 7:
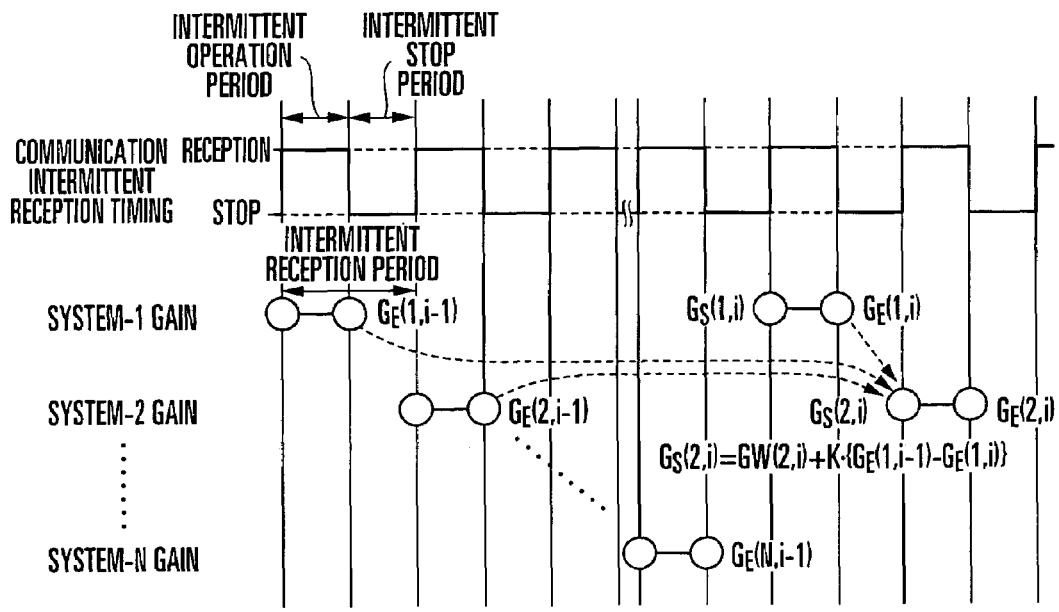
FIG. 7 is a chart for explaining another reception gain calculation method in the reception diversity system according to the third embodiment of the present invention.

A reception diversity system according to the third embodiment of the present invention will be described next with reference to FIGS. 6 and 7. FIG. 6 shows a reception gain calculation method in the reception diversity system according to the third embodiment of the present invention. FIG. 7 shows another reception gain calculation method in the reception diversity system according to the third embodiment of the present invention. Note that the arrangement and intermittent reception operation of the reception diversity system according to this embodiment are the same as those of the first embodiment (see FIGS. 1 and 2), and a description thereof will be omitted.

In the second embodiment described above, as an initial reception gain in a new system whose operation is to be resumed, the statistics value calculated from past reception levels in an arbitrary system is used.

This embodiment will exemplify a case wherein a digital signal processing unit 13 corrects a reference reception gain as a reference for a desired initial reception gain by using a predetermined gain variation amount indicating the latest reception level variation, and the resultant corrected reception level is used as an initial reception gain.

Referring to FIG. 6, as a reference reception gain, the cumulative reception gain used in the second embodiment which is associated with a new system whose operation is to be resumed is used. In addition, as a gain variation amount, the difference between the final set gains as the representative values of reception gains used in the previous and second previous intermittent operation periods of a system which has operated in the immediately preceding intermittent operation period is used. A corrected reception level is calculated by multiplying a gain variation amount by a coefficient and adding the resultant value to the reference reception gain.

For example, in the intermittent operation period corresponding to the intermittent operation number i in system 2, a gain variation amount is obtained from the difference between a final set gain $E_E(1, i)$ used in the previous intermittent operation period of system 1 which has operated in the immediately preceding operation period and a final set gain $G_E(1, i-1)$ used in the second previous intermittent operation period. An initial reception gain $G_S(2, i)$ corresponding to the intermittent operation number i in system 2 is calculated by adding the value obtained by multiplying this gain variation amount by a coefficient K, i.e., a variation value, and a cumulative reception gain $GW(1, i)$ at the intermittent operation number i.

Presented below as equations (3) and (4) are generalized equations for estimating an initial reception gain in this embodiment. In this case, $G_S( )$ represents an initial reception gain; $G_E( )$, a final set gain; $W( )$, a weight; $GW( )$, a cumulative reception gain; n, a system number; i, an intermittent operation number in a new system; j, an intermittent operation number in a system which has operated in the immediately preceding period; K, a coefficient; H, a cumulative count of final set gains; and g, a variable indicating the cumulative count. Note that the coefficient K is a coefficient indicating the degree of influence of a gain variation amount on an initial reception gain, and takes any value larger than 0.

$$G_S(n, i) = GW(n, i) + K \cdot \{G_E(n-1, j-1) - G_E(n-1, j)\} \quad (3)$$

$$GW(n, i) = \sum_{g=1}^{H} G_E(n, i-g) \cdot W(n, -g) \quad (4)$$

Although the case wherein there are two systems has been described with reference to FIG. 6, the same applies to a case wherein there are three or more systems. Assume that systems 1 to N (N is an integer of 3 or more) are to be sequentially operated one by one, as shown in FIG. 7. In this case, as an initial reception gain, a gain variation amount may be obtained from a system which has operated in the immediately preceding period, and a reference reception gain may be obtained from a new system whose operation is to be resumed.

As described above, in the reception diversity system, in intermittent reception operation in which only one of a plurality of systems is operated, while the remaining systems are stopped, when operation in an arbitrary system is to be resumed, the corrected reception level obtained by correcting a reference reception gain as a reference for estimation which is obtained from an arbitrary past reception gain by using a predetermined gain variation amount indicating a reception level variation is used as an initial reception gain at the time of operation resumption. This makes it possible to effectively reflect reception level variations while the system whose operation is to be resumed is stopped, and to follow up reception level variations with high accuracy as compared with a case wherein a reception level used in the past is used as an initial reception gain without any change.

In addition, using a cumulative reception gain in a new system whose operation is to be resumed as a reference reception gain can cope with even a case wherein a reception gain greatly varies temporarily in the previous intermittent operation in a new system, thereby stabilizing the reference reception gain. Note that when reception gain variations are positively taken into consideration, the final set gain used in the previous intermittent operation period may be used as a reference reception gain instead of a cumulative reception gain.

Furthermore, as a gain variation amount, the difference between the final set gains used in the previous and second previous intermittent operation periods in a system which has operated in the immediately preceding intermittent operation period is used. This makes it possible to reflect the latest reception gain variation in an initial reception gain and accurately follow up reception level variations.

This embodiment has exemplified the case wherein as a gain variation amount, the difference between the final set gains used in the previous and second previous intermittent operation periods in a system which has operated in the immediately preceding intermittent operation period is used. However, the present invention is not limited to this, and another gain variation amount may be used.

For example, the difference between the final set gain as a representative value of the reception gains used in the previous intermittent operation period in a system which has operated in the immediately preceding intermittent operation period and a cumulative reception gain of the system may be used as a gain variation amount. This makes it possible to suppress the influence of a temporary reception gain variation in the system and realize stable reception gain adjustment.

[Fourth Embodiment]

A reception diversity system according to the fourth embodiment of the present invention will be described next. Note that the arrangement and intermittent reception operation of the reception diversity system according to this embodiment are the same as those of the first embodiment (see FIGS. 1 and 2), and a description thereof will be omitted.

In the third embodiment described above, a reference reception gain as a reference for a desired initial reception gain is corrected by a predetermined gain variation amount indicating a latest reception level variation, and the resultant corrected reception level is used as an initial reception gain.

In this embodiment, a coefficient K indicating the degree of influence on the above gain variation amount with respect to an initial reception gain in a digital signal processing unit 13 will be described in detail.

When a reference reception gain is to be corrected by a gain variation amount, the coefficient K is important. As the coefficient K increases, the degree of influence of a gain variation amount on an initial reception gain increases, and the initial reception gain greatly varies. As the coefficient K decreases, the degree of influence of a gain variation amount on the initial reception gain decreases, and the initial reception gain does not vary much.

In this case, if the degree of influence of the reference reception gain on the initial reception gain is equal to that of the gain variation amount, the reference reception gain is corrected 100% at the maximum. This condition can therefore be used as a reference.

More specifically, if the degree of influence of a gain variation amount on an initial reception gain is lower than that of a reference reception gain, correction with respect to the reference reception gain is suppressed. Therefore, by using the coefficient K which makes the variation width (span) of the gain variation amount smaller than the variation width (span) of the initial reception gain as the first condition, variations in initial reception gain can be suppressed, thereby realizing stable reception gain adjustment. When good reception quality is obtained, in particular, the reception gain need not be greatly changed, and the coefficient K that satisfies the first condition described above is effective.

Note that when the degree of influence of a gain variation amount on an initial reception gain is set to ½ that of the reference reception gain, variations in initial reception gain can be suppressed 100% or less even if an estimated gain variation amount is wrong.

In contrast, if the degree of influence of a gain variation amount on an initial reception gain is larger than that of a reference reception gain, correction with respect to the reference reception gain is promoted. Using the coefficient K that makes the variation width (span) of a gain variation amount become equal to or larger than the variation width (span) of the initial reception gain makes it possible to promote a variation in initial reception gain, thereby realizing dynamic reception gain adjustment. When an initial reception gain cannot be predicted as in a case wherein the reception diversity system is started, or the variation width of a reception gain is large, in particular, a reception gain can converge quickly by using the coefficient K that satisfies the second condition described above.

In addition, the value of the coefficient K may be adaptively controlled in accordance with the reception state of radio waves. For example, the digital signal processing unit 13 compares the difference between the magnitude (amplitude) of a reception signal with the magnitude (amplitude) of a signal as a control target with a predetermined threshold. If the difference is larger than the threshold, the coefficient K that satisfies the second condition is used. If the different is equal to or smaller than the threshold, the coefficient K that satisfies the first condition is used.

This makes it possible to effectively use the merits obtained when the coefficients K that respectively satisfy the first and second conditions are used, thus realizing reception gain adjustment while properly following up variations in reception level.

[Fifth Embodiment]

A reception diversity system according to the fifth embodiment of the present invention will be described next. Note that the arrangement and intermittent reception operation of the reception diversity system according to this embodiment are the same as those of the first embodiment (see FIGS. 1 and 2), and a description thereof will be omitted.

The third embodiment described above has exemplified the case wherein a reference reception gain as a reference for a desired initial reception gain is corrected by a predetermined gain variation amount indicating the latest reception level variation, and the resultant corrected reception level is used as an initial reception gain.

This embodiment will exemplify a case wherein a digital signal processing unit 13 corrects a reference reception gain by using the gain ratio between a reception gain representing a new system whose operation is to be resumed and a reception gain representing a system which has operated in the immediately preceding intermittent operation period, and uses the resultant corrected reception level as an initial reception gain.

In this case, as a reference reception gain, the final set gain used in the previous operation in a new system whose operation is to be resumed is used. In addition, as a reception gain representing the new system whose operation is to be resumed, a cumulative reception gain in the system is used. As a reception gain representing the system which has operated in the immediately preceding intermittent operation period, a cumulative reception gain in the system is used. As a gain ratio, the ratio between these cumulative reception gains is used.

Presented below as equation (5) is a generalized equation for estimating an initial reception gain in this embodiment. In this case, $G_S(\ )$ represents an initial reception gain; $G_E(\ )$, a final set gain; $GW(\ )$, a cumulative reception gain; n, a system number; i, an intermittent operation number in a new system; and j, an intermittent operation number in a system which has operated in the preceding period. Note that a coefficient K is a coefficient indicating the degree of influence of a gain variation amount on an initial reception gain, and takes any value larger than 0. Assuming that the respective systems operate in ascending order of system numbers, when the system number becomes 0, a system count N (N is an integer of 2 or more) is cyclically used as n.

$$G_S(n, i) = G_E(n, i) \cdot \frac{GW(n-1, j)}{GW(n, j)} \quad (5)$$

In this manner, a reference reception gain is corrected by the gain ratio between a reception gain representing a new system whose operation is to be resumed and a reception gain representing a system which has operated in the immediately preceding intermittent operation period, and the resultant corrected reception level is used as an initial reception gain. This makes it possible to effectively reflect variations in reception level during a period in which the system whose operation is to be resumed in an initial reception gain and accurately follow up reception level variations as compared with a case wherein a reception level used in the past is used as an initial reception gain without any change.

In addition, since the ratio between cumulative reception gains in a new system and a system which has operated in the immediately preceding intermittent operation period is used as a gain ratio, even if any of the past gains greatly varies temporarily, the influence of the variation on the initial reception gain can be suppressed, thereby realizing stable reception gain adjustment.

[Sixth Embodiment]

Figure 8:
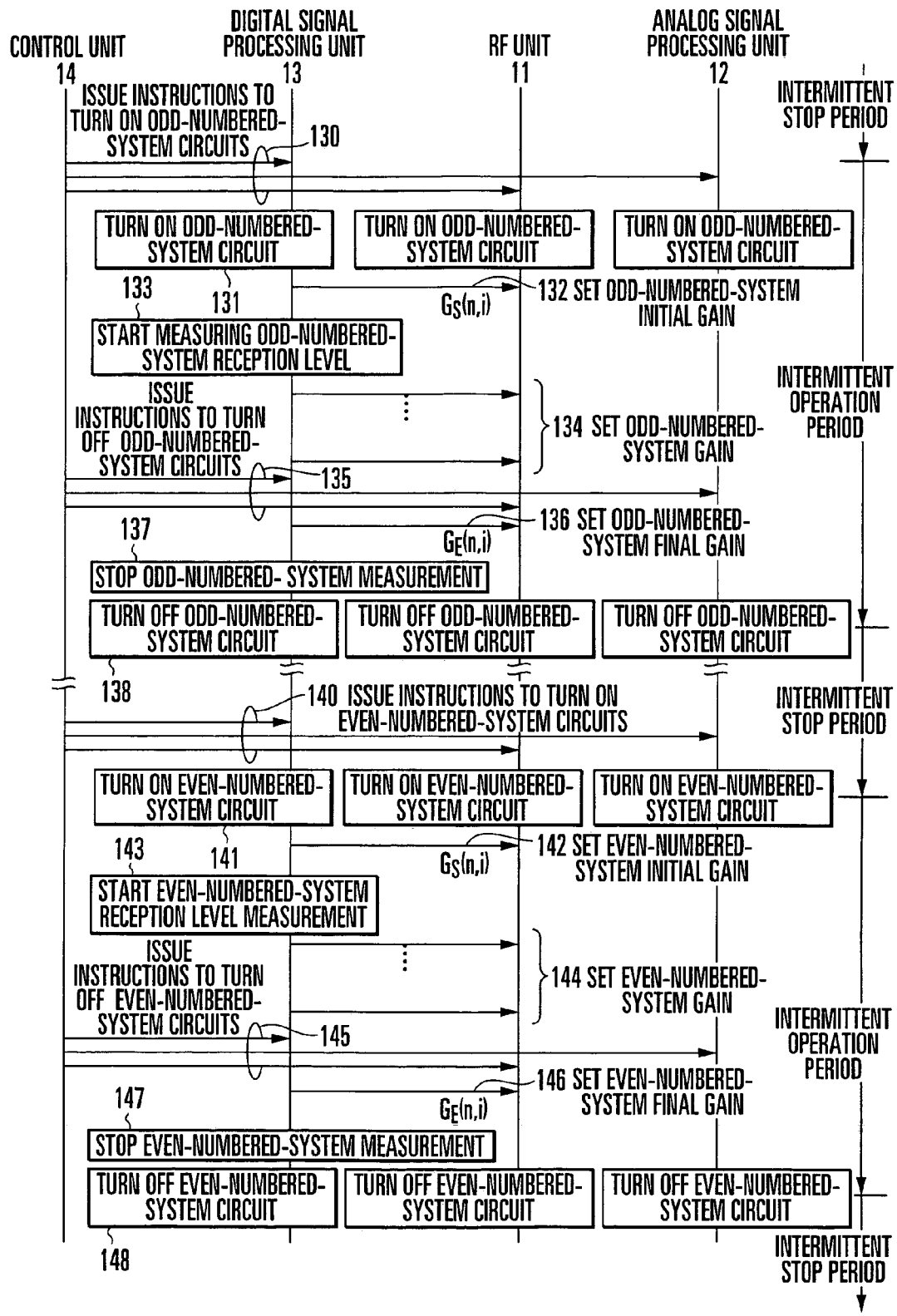
FIG. 8 is a view showing a sequence indicating the intermittent reception operation of a reception diversity system according to the sixth embodiment of the present invention.
Figure 9:
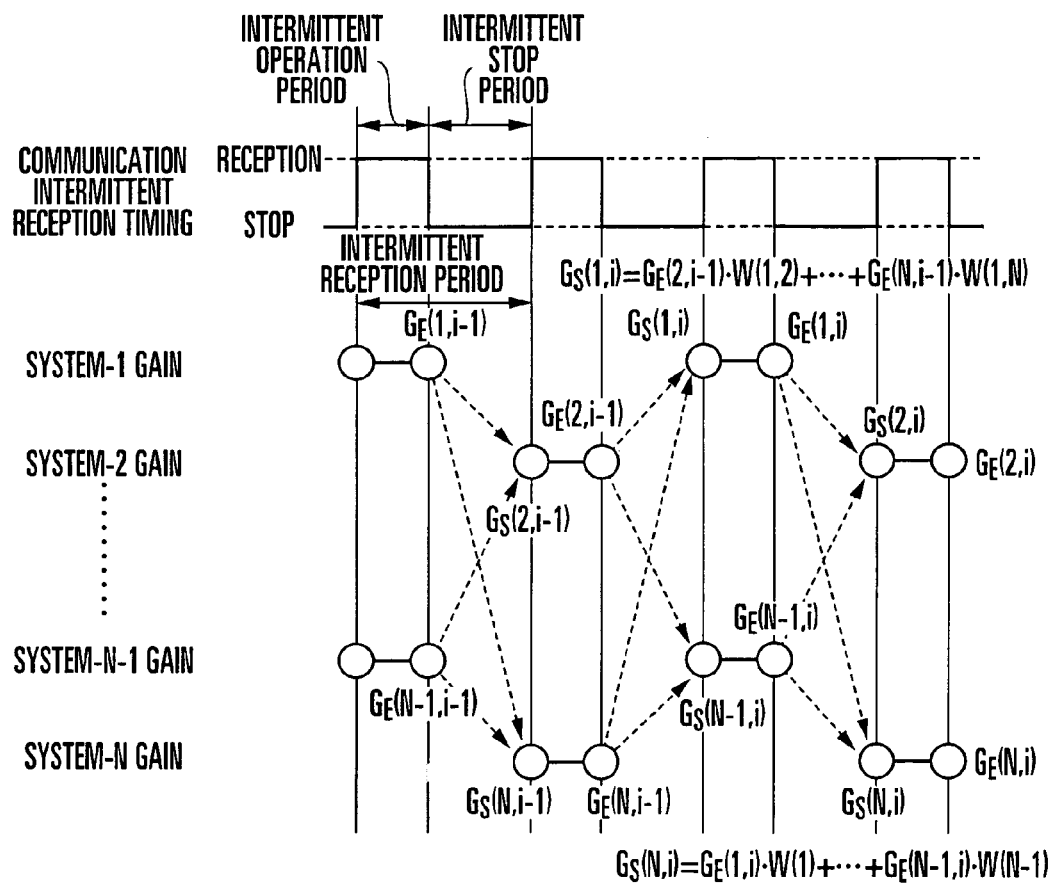
FIG. 9 is a chart for explaining a reception gain calculation method in the reception diversity system according to the sixth embodiment of the present invention.

A reception diversity system according to the sixth embodiment of the present invention will be described next with reference to FIGS. 8 and 9. FIG. 8 shows the intermittent reception operation of the reception diversity system according to the sixth embodiment of the present invention. FIG. 9 shows a reception gain calculation method in the reception diversity system according to the sixth embodiment of the present invention. Note that the arrangement of the reception diversity system according to this embodiment is the same as that of the first embodiment (see FIG. 1) described above, and hence a description thereof will be omitted.

Each embodiment described above has exemplified the case wherein the control unit 14 performs intermittent reception operation in which only one of a plurality of systems is operated while the remaining systems are stopped as shown in FIG. 19 in, for example, a standby time during which the wireless terminal is not used for speech communication or communication.

In this embodiment, in intermittent reception operation, the respective systems are divided into system groups, and the respective groups are controlled such that in each intermittent operation period, only systems belonging to a predetermined system group of the respective groups are operated while systems belonging to the remaining system groups are stopped.

In the following description, the respective systems are divided into two system groups respectively including systems with odd- and even-numbered systems, and the two systems are alternately operated.

Referring to FIG. 1, system-1 circuits 11A, 12A, and 13A are regarded as circuits of the odd-numbered system, and system-2 circuits 11B, 12B, and 13B are regarded as circuits of the even-numbered system.

First of all, a control unit 14 sends instructions to an RF unit 11, analog signal processing unit 12, and digital signal processing unit 13 to turn on, for example, the odd-numbered-system circuits 11A, 12A, and 13A, respectively, in accordance with the arrival of an odd-numbered-system intermittent operation period (step 130).

In response to these instructions, the RF unit 11, analog signal processing unit 12, and digital signal processing unit 13 respectively turn on the odd-numbered-system circuits 11A, 12A, and 13A to operate the respective circuits (step 131).

The digital signal processing unit 13 then causes the odd-numbered-system circuit 13A to set, in the odd-numbered-system circuit 11A of the RF unit 11, an initial reception gain $G_S(n, i)$ estimated from the final set gain used in the immediately preceding operation of the odd-numbered-system circuit 11B of the RF unit 11 for each odd-numbered system n (n is an odd number) (step 132).

Subsequently, the digital signal processing unit 13 causes the odd-numbered-system circuit 13A to start measuring the reception level of each odd-numbered-system digital reception signal received through the odd-numbered-system circuit 11A of the RF unit 11 and the odd-numbered-system circuit 12A of the analog signal processing unit 12 (step 133).

The digital signal processing unit 13 then causes the odd-numbered-system circuit 13A to calculate a gain to be set in the odd-numbered-system circuit 11A of the RF unit 11 on the basis of the level measurement result and set the gain in the odd-numbered-system circuit 11A of the RF unit 11. The digital signal processing unit 13 repeatedly performs this operation during an intermittent operation period (step 134).

In this case, for example, gain calculation may be performed by the following method. If the level measurement result on a digital reception signal is lower than the level required for the odd-numbered-system circuit 13A of the digital signal processing unit 13 by X dB, the gain to be set in the odd-numbered-system circuit 11A of the RF unit 11 is increased by X dB. If the measurement result is higher than the above level by X dB, the gain to be set in the odd-numbered-system circuit 11A of the RF unit 11 is decreased by X dB.

Subsequently, the control unit 14 sends instructions to the RF unit 11, analog signal processing unit 12, and digital signal processing unit 13 to turn off the odd-numbered-system circuits 11A, 12A, and 13A, respectively, in accordance with the arrival of an odd-numbered-system intermittent stop period (step 135).

In accordance with this operation, the odd-numbered-system circuit 13A of the digital signal processing unit 13 stores/holds $G_E(n, i)$ as the final set gain set in the odd-numbered-system circuit 11A of the RF unit 11 in step 136, and stops reception level measurement (step 137).

The RF unit 11, analog signal processing unit 12, and digital signal processing unit 13 then turn off the odd-numbered-system circuits 11A, 12A, and 13A to stop their operations (step 138).

The control unit 14 then sends instructions to the RF unit 11, analog signal processing unit 12, and digital signal processing unit 13 to turn on the even-numbered-system circuits 11B, 12B, and 13B, respectively, in accordance with the arrival of an intermittent operation period of system 2 (step 140).

In accordance with the instructions, the RF unit 11, analog signal processing unit 12, and digital signal processing unit 13 turn on the even-numbered-system circuits 11B, 12B, and 13B, respectively, to operate them (step 141).

The digital signal processing unit 13 causes the even-numbered-system circuit 13B to set, in the even-numbered-system circuit 11B of the RF unit 11, an initial reception gain $G_S(n, i)$ estimated for each even-numbered system (n is an even number) from the final set gain $G_E(n, i)$ (n is an odd number) which was used for the previous operation by the even-numbered-system circuit 11B of the RF unit 11 (step 142).

The digital signal processing unit 13 then causes the even-numbered-system circuit 13B to start measuring the reception level of the even-numbered-system digital reception signal received through the even-numbered-system circuit 11B of the RF unit 11 and the even-numbered-system circuit 12B of the analog signal processing unit 12 (step 143).

The even-numbered-system circuit 13B calculates a gain to be set in the even-numbered-system circuit 11B of the RF unit 11 on the basis of the level measurement result, and sets the gain in the even-numbered-system circuit 11B of the RF unit 11. The even-numbered-system circuit 13B repeatedly performs this operation during an intermittent operation period (step 144).

Subsequently, the control unit 14 sends instructions to the RF unit 11, analog signal processing unit 12, and digital signal processing unit 13 to turn off the even-numbered-system circuits 11B, 12B, and 13B, respectively, in accordance with the arrival of an even-numbered-system intermittent stop period (step 145).

In accordance with this operation, the even-numbered-system circuit 13B of the digital signal processing unit 13 stores/holds $G_E(n, i)$ as the final set gain set in the even-numbered-system circuit 11B of the RF unit 11 in step 146, and stops reception level measurement (step 147).

The RF unit 11, analog signal processing unit 12, and digital signal processing unit 13 then turn off the even-numbered-system circuits 11B, 12B, and 13B to stop their operations (step 148). The intermittent operation period then shifts to an intermittent stop period, and the above intermittent reception operation is repeatedly performed.

In this manner, in an intermittent reception operation, the respective systems are divided into a plurality of system groups, and only the systems belonging to a predetermined system group of the respective system groups are operated while the systems belonging to the remaining system groups are stopped in each intermittent operation period. This can shorten a period in which each system is stopped, even if the number of systems is large, as compared with the above case wherein the systems are operated one by one. This makes it possible to reduce reception level variations in a period in which each system stops reception operation and accurately follow up reception level variations.

In addition, as an initial reception gain in each system, the gain estimated for each system from the past reception gain used in each system of each system group which has operated in the immediately preceding intermittent operation period, e.g., the final set gain, is used. This makes it possible to reflect the latest reception gain variation in the initial reception gain and accurately follow up reception level variations. In this case, as an initial reception gain in each system, the gain estimated for each system from the past reception gain used in the previous intermittent operation period of the system group, e.g., the final set gain, may be used.

Note that an initial reception gain used in this embodiment may be obtained by using the initial reception gain reception gain calculation method described in each embodiment.

Referring to FIG. 9, as an initial reception gain to be set in each system of a new system group whose reception operation is to be resumed, the cumulative reception gain obtained by weighting the final set gains used in the respective systems of the system group which has operated in the immediately preceding intermittent operation period and totaling the resultant gains is used. In this case, a weight W is separately set for each system of the new system group with respect to each system of the proximate system group.

For example, as for an initial reception gain $G_S(1, i)$ at an intermittent operation number i in system 1 belonging to the odd-numbered system group, a cumulative reception gain is calculated by multiplying final set gains $G_E(g, j)$ (g is an even-numbered system number, and j is a proximate intermittent operation number in an even-numbered system) used in each system of an even-numbered system which has operated in the immediately preceding intermittent operation period by weights W(j, 1) used in system 1 and totaling the resultant values.

Note that "J" of the weight W(j, 1) represents a system number in a proximate system group from which the respective final set gains are obtained, and "1" is a system number in a new system group. The total sum of the weights W is equal to or less than 1, which represents the degree of influence of each final set gain $G_E$ on an initial reception gain.

Presented below as equation (6) is a generalized equation for estimating an initial reception gain in this embodiment. In this case, $G_S(\ )$ represents an initial reception gain; $G_E(\ )$, a final set gain; W( ), a weight; n, a system number; i, an intermittent operation number in a new system; j, an intermittent operation number in a system which has operated in the immediately preceding period; and g, a variable indicating each system number in a proximate system group.

$$G_S(n, i) = \sum_E G_E(g, j) \cdot W(g, n) \qquad (6)$$

As described above, as an initial reception gain, the statistics value calculated from each past reception gain in a proximate system group is used. Even if, therefore, any of the past gains greatly varies temporarily, the influence of the variation on the initial reception gain can be suppressed, thereby realizing stable reception gain adjustment.

In addition, as the above past reception gains, reception gains representing the respective intermittent operation periods, e.g., the final set gains, are used respectively. This makes it possible to use reception levels in a state wherein reception gain follow-up control is sufficiently performed in an intermittent operation period and hence to accurately follow up reception level variations.

[Seventh Embodiment]

Figure 10:
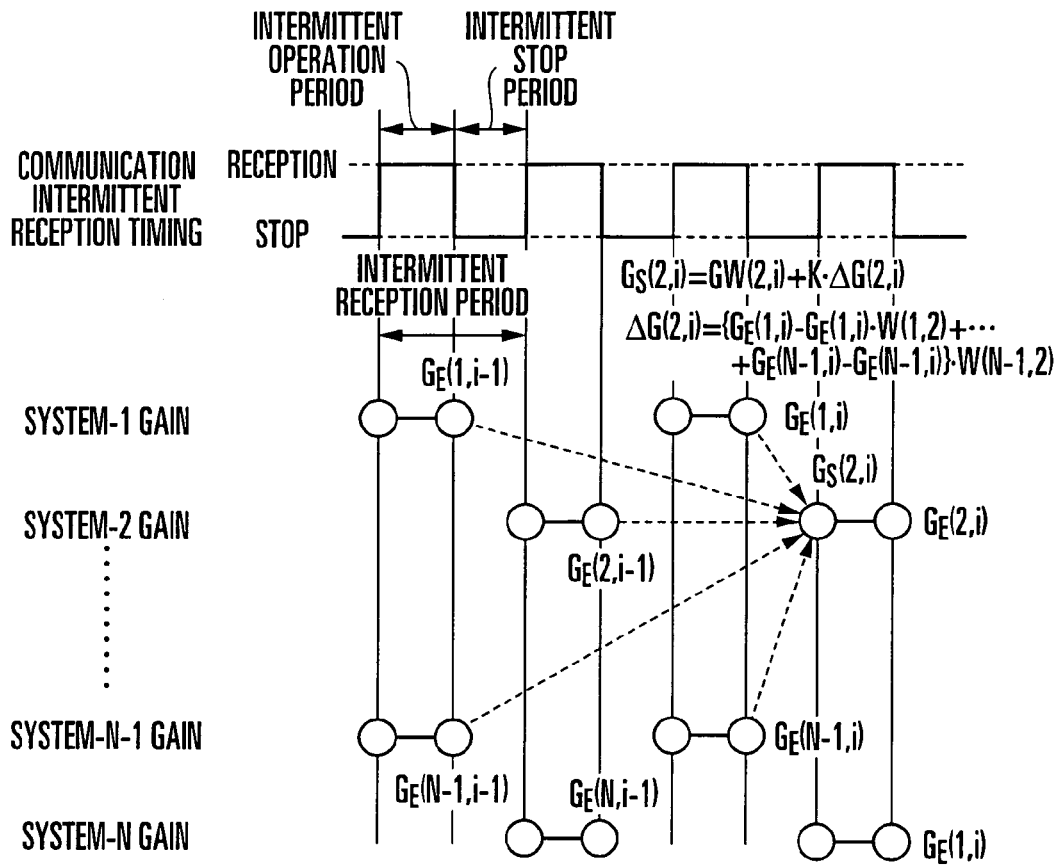
FIG. 10 is a chart for explaining a reception gain calculation method in a reception diversity system according to the seventh embodiment of the present invention.

A reception diversity system according to the seventh embodiment will be described next with reference to FIG. 10. FIG. 10 shows a reception gain calculation method in the reception diversity system according to the seventh embodiment. Note that the arrangement and intermittent reception operation of the reception diversity system according to this embodiment are the same as those of the first embodiment (see FIG. 1) and those of the sixth embodiment (see FIG. 8), and a description thereof will be omitted.

The sixth embodiment has exemplified the case wherein the statistics value calculated from each final reception gain in the proximate system group is used as an initial reception gain.

In this embodiment, for each system of a new system group whose reception operation is to be resumed, a reference reception gain as a reference for an initial reception gain in the system is corrected by a predetermined gain variation amount representing a latest reception level variation, and the resultant corrected reception level is used as an initial reception gain.

Referring to FIG. 10, as a reference reception gain, the cumulative reception gain used in the second embodiment which is associated with a system of interest of a new system group whose operation is to be resumed is used. As a gain variation amount, a statistics value is used, which is obtained by weighting the differences between the final set gains used in the previous and second previous intermittent operation periods in the proximate system group which has operated in the immediately preceding intermittent operation period and totaling the resultant values.

A corrected reception level is calculated by multiplying a gain variation amount by a coefficient and adding the resultant value to a reference reception gain.

For example, in an intermittent operation period corresponding to an intermittent operation number i in even-numbered system 2, a gain variation amount $\Delta G(2, i)$ is obtained from the difference between a final set gain $G_E(g, j)$ (g is an odd-numbered system number, and j is an immediately preceding intermittent operation number in an odd-numbered system) used in the previous intermittent operation period for each odd-numbered system which has operated in the immediately preceding intermittent operation period and a final set gain $G_E(g, j-1)$ used in the second previous intermittent operation period. An initial reception gain $G_S(2, i)$ at the intermittent operation number i in system 2 is calculated by adding the product of this gain variation amount and a coefficient K to a cumulative reception gain GW(2, i) at the intermittent operation number i.

Presented below as equations (7) and (8) are generalized equations for estimating an initial reception gain in this embodiment. In this case, $G_S(\ )$ represents an initial reception gain; $G_E(\ )$, a final set gain; W( ), a weight; GW( ), a cumulative reception gain; $\Delta G(\ )$, a gain variation amount; n, a system number in a new system group; i, an intermittent operation number in a new system; j, an intermittent operation number in a system which has operated in the immediately preceding period; K, a coefficient; and g, a variable indicating each system number in a proximate system group.

$$G_S(n, i) = GW(n, i) + K \cdot \Delta G(n, i) \qquad (7)$$

$$\Delta G(n, i) = \sum_g [\{G_E(g, j-1) - G_E(g, j)\} \cdot W(n, g)] \qquad (8)$$

As described above, for each system of a new system group whose reception operation is to be resumed, a reference reception gain as a reference for an initial reception gain in the system is corrected by a predetermined gain variation amount indicating a latest reception level variation, and the resultant corrected reception level is used as an initial reception gain. This makes it possible to use an initial reception gain in which reception level variations during a period in which the system whose operation is to be resumed is stopped is effectively reflected and to accurately follow up reception level variations as compared with the case wherein a reception level used in the past is used as an initial reception gain without any change.

In addition, using a cumulative reception gain in a new system whose operation is to be resumed as a reference reception gain can cope with even a case wherein a reception gain greatly varies temporarily in the previous intermittent operation in the new system, thereby stabilizing the reference reception gain. Note that when reception gain variations are positively taken into consideration, the final set gain used in the previous intermittent operation period may be used as a reference reception gain instead of a cumulative reception gain.

Furthermore, as a gain variation amount, a statistics value is used, which is obtained by weighting the differences between the final set gains used in the previous and second previous intermittent operation periods in the respective systems of the proximate system group and totaling the resultant values. This makes it possible to reflect the latest reception gain variation in an initial reception gain and accurately follow up reception level variations.

[Eighth Embodiment]

Figure 11:
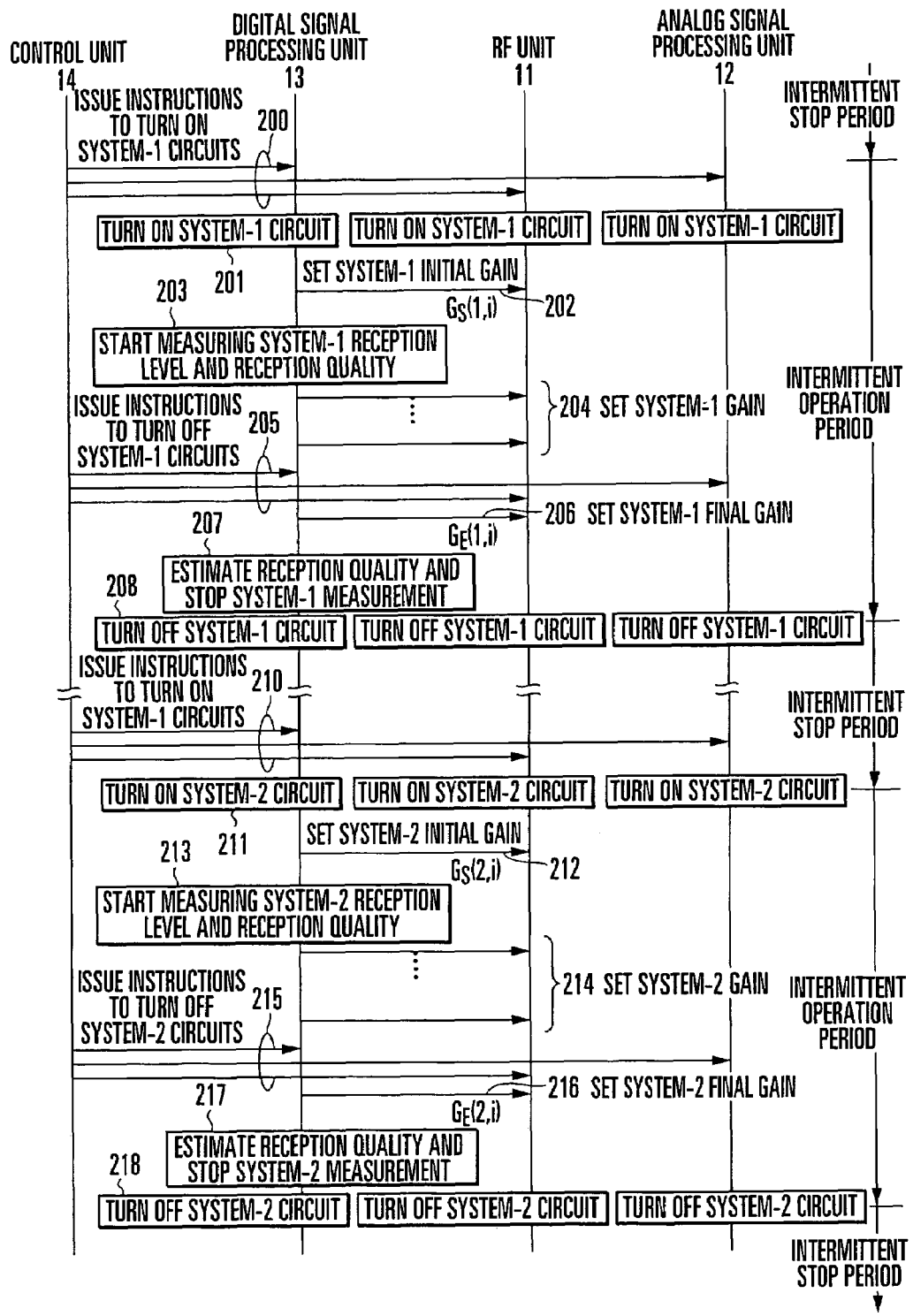
FIG. 11 is a view showing a sequence indicating the intermittent reception operation of a reception diversity system according to the eighth embodiment of the present invention.
Figure 12:
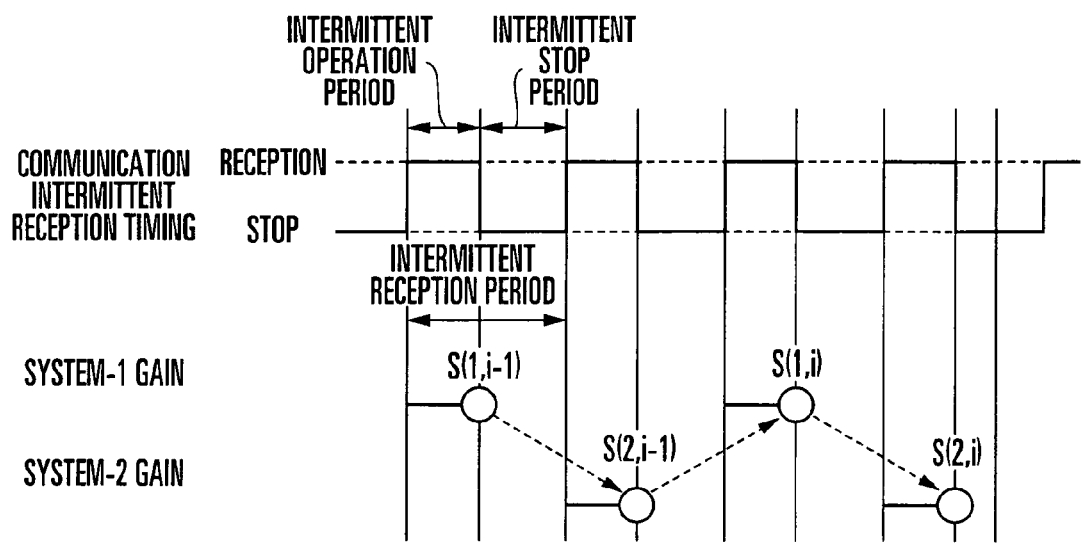
FIG. 12 is a chart for explaining a total reception quality calculation method in the reception diversity system according to the eighth embodiment of the present invention.

A reception diversity system according to the eighth embodiment of the present invention will be described next with reference to FIGS. 11 and 12. FIG. 11 shows a sequence indicating the intermittent reception operation of the reception diversity system according to the eighth embodiment of the present invention. FIG. 12 shows a total reception quality calculation method in the reception diversity system according to the eighth embodiment of the present invention. The arrangement of the reception diversity system according to this embodiment is the same as that of the first embodiment described above (see FIG. 1), and a description thereof will be omitted.

Each embodiment described above has exemplified the method of calculating an initial reception gain in a new system whose operation is to be resumed, for each intermittent operation period, in an intermittent reception operation in which only a predetermined system of the respective systems is operated while the remaining systems are stopped.

This embodiment will exemplify a method of calculating total reception quality such as an SNR or SIR value, for each intermittent operation period in intermittent reception operation, when reception signals obtained by concurrently operating all the systems are combined.

In this embodiment, total reception quality is calculated from reception quality obtained from a reception signal received by a system which is operating in the intermittent operation period and estimated reception quality in the remaining stopped systems obtained by estimation in the intermittent operation period.

As reception quality, SNR (Signal to Noise Ratio) or SIR (Signal to Interference Ratio) is available. An SNR represents the ratio between signal power and noise power. An SIR represents the ratio between signal power and interference power. As a practical method of measuring an SNR or SIR, a known measurement method may be used, and a description thereof will be omitted.

First of all, a control unit 14 sends instructions to the RF unit 11, analog signal processing unit 12, and digital signal processing unit 13 to turn on system-1 circuits 11A, 12A, and 13A in accordance with the arrival of an intermittent reception period of system 1 (step 200).

In response to these instructions, the RF unit 11, analog signal processing unit 12, and digital signal processing unit 13 turn on the system-1 circuits 11A, 12A, and 13A, respectively, and operate them (step 201).

The digital signal processing unit 13 causes the system-1 circuit 13A to read out the final set gain which has been used in the immediately preceding intermittent operation period and stored/held, and sets it as an initial reception gain for the system-1 circuit 11A of the RF unit 11 (step 202).

This initial reception gain is obtained by the calculation method based on the first embodiment. However, the present invention is not limited to this, and an initial reception gain may be calculated by using another embodiment described above.

Subsequently, the digital signal processing unit 13 causes the system-1 circuit 13A to start measuring the reception level and reception quality of a system-1 digital reception signal received through the system-1 circuit 11A of the RF unit 11 and the system-1 circuit 12A of the analog signal processing unit 12 (step 203).

The system-1 circuit 13A calculates a gain to be set in the system-1 circuit 11A of the RF unit 11 on the basis of the level measurement result, and sets the gain in the system-1 circuit 11A of the RF unit 11. The system-1 circuit 13A repeatedly performs this operation in an intermittent operation period (step 204).

Subsequently, the control unit 14 sends instructions to the RF unit 11, analog signal processing unit 12, and digital signal processing unit 13 to turn off the system-1 circuits 11A, 12A, and 13A, respectively, in accordance with the arrival of an intermittent stop period of system 1 (step 205).

In accordance with this operation, the system-1 circuit 13A of the digital signal processing unit 13 stores/holds the final set gain set in the system-1 circuit 11A of the RF unit 11 in step 206. The system-1 circuit 13A also calculates total reception quality in the manner described later and stores/holds it, and stops reception level and reception quality measurement (step 207).

The RF unit 11, analog signal processing unit 12, and digital signal processing unit 13 then turn off the system-1 circuits 11A, 12A, and 13A to stop their operations (step 208).

The control unit 14 then sends instructions to the RF unit 11, analog signal processing unit 12, and digital signal processing unit 13 to turn on system-2 circuits 11B, 12B, and 13B, respectively, in accordance with the arrival of an intermittent operation period of system 2 (step 210).

In accordance with the instructions, the RF unit 11, analog signal processing unit 12, and digital signal processing unit 13 turn on the system-2 circuits 11B, 12B, and 13B, respectively, to operate them (step 211).

The digital signal processing unit 13 causes the system-2 circuit 13B to read out the final set gain stored/held by using the immediately preceding intermittent operation period, and sets it as an initial reception gain in the system-2 circuit 11B of the RF unit 11 (step 212).

The digital signal processing unit 13 then causes the system-2 circuit 13B to start measuring the reception level and reception quality of the system-2 digital reception signal received through the system-2 circuit 11B of the RF unit 11 and the system-2 circuit 12B of the analog signal processing unit 12 (step 213).

The system-2 circuit 13B calculates a gain to be set in the system-2 circuit 11B of the RF unit 11 on the basis of the level measurement result, and sets the gain in the system-2 circuit 11B of the RF unit 11. The system-2 circuit 13B repeatedly perform this operation in an intermittent operation period (step 214).

Subsequently, the control unit 14 sends instructions to the RF unit 11, analog signal processing unit 12, and digital signal processing unit 13 to turn off the system-2 circuits 11B, 12B, and 13B, respectively, in accordance with the arrival of an intermittent stop period of system 2 (step 215).

In accordance with this operation, the system-2 circuit 13B of the digital signal processing unit 13 stores/holds the final set gain set in the system-2 circuit 11B of the RF unit 11 in step 216. The system-2 circuit 13B also calculates total reception quality in the manner described later and stores/holds it, and stops reception level and reception quality measurement (step 227).

The RF unit 11, analog signal processing unit 12, and digital signal processing unit 13 then turn off the system-2 circuits 11B, 12B, and 13B to stop their operations (step 218). The intermittent operation period then shifts to an intermittent stop period, and the above intermittent reception operation is repeatedly performed.

As for total reception quality, as reception quality in an intermittent operation period of interest of each stopped system which is stopped in the intermittent operation period, the reception quality measured in the previous intermittent operation period of the stopped system is used. More specifically, as shown in FIG. 12, the reception quality measured in the system which is operating in the intermittent operation period of interest is combined with the reception quality measured in the previous intermittent operation period of the system stopped in the intermittent operation period of interest to obtain total reception quality.

For example, total reception quality ST(1, i) at an intermittent operation number i of system 1 is obtained by combining reception quality S(1, i) obtained at the intermittent operation number i of system 1 with reception quality S(2, i) measured in the immediately preceding intermittent operation period of system 2 which is stopped in the intermittent operation period of interest.

Note that since the reception quality S( ) is a dB value, the dB values are added after converted into true values, and the sum is converted into a dB value again.

Presented below as equation (9) is a generalized equation for estimating an initial reception gain in this embodiment. In this case, ST( ) represents total reception quality; S( ), the reception quality of each system; n, a system number; j, an intermittent operation number in each system; g, a variable indicating the system number of each stopped system; and j, a previous intermittent operation number in each stopped system.

$$ST(n, i) = 10 \times \log_{10}\left\{10^{S(n,i)/10} + \sum_E 10^{S(g,j)/10}\right\} \quad (9)$$

As described above, total reception quality obtained when all the system are concurrently operated is calculated from the reception quality obtained from a reception signal received by a new system which is operating in an intermittent operation period of interest and the reception quality obtained by estimation in the intermittent operation period of interest of another stopped system. Therefore, even in intermittent operation in which only one system of a plurality of systems is operated while the remaining systems are stopped, the total reception quality obtained when all the systems are concurrently operated can be estimated. The estimated total reception quality can be used to determine whether to switch cells (base stations).

In addition, as the reception quality of each stopped system in the intermittent operation period, the reception quality obtained by the previous operation of each stopped system is used. Therefore, total reception quality can be accurately calculated by simple calculation processing.

Note that the reception quality of each stopped system in an intermittent operation period of interest is not limited to this. For example, instead of the reception quality obtained in the previous operation of each stopped system, the reception quality obtained in an intermittent operation period preceding the previous operation may be used.

[Ninth Embodiment]

A reception diversity system according to the ninth embodiment of the present invention will be described next. Note that the arrangement and intermittent reception operation of the reception diversity system according to this embodiment are the same as those of the first embodiment (see FIG. 1) and those of the seventh embodiment (see FIG. 11), and a description thereof will be omitted.

The eighth embodiment described above has exemplified the case wherein as the reception quality of each stopped system in the intermittent operation period, the reception quality obtained in the previous operation of each stopped system is used.

In this embodiment, the reception quality obtained in an intermittent operation period of interest in which a new system is operating is used as the reception quality of each stopped system in the intermittent operation system.

Presented below as equation (10) is a generalized equation for estimating total reception quality in this embodiment. In this case, ST( ) represents total reception quality; S( ), the reception quality of each system; n, a system number; N, a total system count; and i, an intermittent operation number in each system.

$$ST(n, i) = 10 \times \log_{10}(N \cdot 10^{S(n,i)/10}) \quad (10)$$

This makes it possible to calculate high-accuracy total reception quality based on the latest reception quality by simple calculation processing.

Note that the reception quality of each stopped system in an intermittent operation period of interest is not limited to this. For example, the reception quality of each stopped system may be estimated from one or more reception qualities obtained in an intermittent operation period preceding the intermittent operation period of interest of a new system which is operating in the intermittent operation period of interest. In this case, the reception quality of each stopped system may be estimated, including the reception quality obtained in the intermittent operation period of interest of a new system which is operating in the intermittent operation period of interest.

[10th Embodiment]

A reception diversity system according to the 10th embodiment of the present invention will be described next. Note that the arrangement and intermittent reception operation of the reception diversity system according to this embodiment are the same as those of the first embodiment (see FIG. 1) and those of the eighth embodiment (see FIG. 11), and a description thereof will be omitted.

The eighth embodiment described above has exemplified the case wherein as the reception quality of each stopped system in an intermittent operation period of interest, the reception quality obtained in the previous operation of each stopped system is used.

In this embodiment, the statistics value calculated from a plurality of reception qualities obtained in the past in each stopped system in an intermittent operation period of interest is used as the reception quality of each stopped system in the intermittent operation period of interest.

As this statistics value, the cumulative reception quality of a stopped system of interest is calculated by weighting a plurality of reception qualities obtained in the past in the stopped system of interest and totaling the resultant values.

This cumulative reception quality may be used as the reception quality of each stopped system in the intermittent operation period of interest.

Presented below as equation (11) is a generalized equation for estimating an initial reception gain in this embodiment. In this case, ST( ) represents total reception quality; S( ), the reception quality of each system; n, a system number; i, an intermittent operation number in each system; H, a cumulative count of reception quality; and g, a variable indicating the cumulative count H. In general, a lager value is used as a weight W for an intermittent operation period temporally closer to an initial reception gain. Equation (11) can be regarded as a moving average calculation expression using the weight W as a forgetting factor.

$$ST(n, i) = 10 \times \log_{10} \sum_{g=1}^{H} \{10^{S(n, 1-g)} \cdot W(n, -g)\} \quad (11)$$

As described above, since the statistics value obtained from a plurality of reception qualities obtained in the past in a stopped system of interest is used as the reception quality of the stopped system in an intermittent operation period of interest, even if any of the past reception qualities greatly varies temporarily, the influence of the variation on the estimation of reception quality can be suppressed, thereby obtaining stable reception quality.

In addition, as a statistics value, the cumulative reception quality obtained by weighting a plurality of reception qualities obtained in the past in a stopped system of interest and totaling the resultant values is used. This makes it possible to accurately follow up variations in reception quality.

[11th Embodiment]

A reception diversity system according to the 11th embodiment of the present invention will be described next. Note that the arrangement and intermittent reception operation of the reception diversity system according to this embodiment are the same as those of the first embodiment (see FIG. 1) and those of the eighth embodiment (see FIG. 11), and a description thereof will be omitted.

The 10th embodiment described above has exemplified the case wherein as the reception quality of each stopped system in an intermittent operation period of interest, the statistics value of calculated from reception qualities in the past obtained in each stopped system is used.

In this embodiment, reference reception quality as a reference for estimation which is obtained from arbitrary past reception quality is corrected by a predetermined reception quality variation amount indicating a reception quality variation, and the resultant corrected reception quality is used as the reception quality of each stopped system in an intermittent operation period of interest.

In this case, as reference reception quality, the cumulative reception quality of a stopped system of interest which is used in the ninth embodiment described above may be used. In addition, as a reception quality variation amount, the difference between reception qualities obtained in the previous and second previous intermittent operation periods of the stopped system of interest may be used. Corrected reception quality may be calculated by multiplying the quality variation amount by a coefficient and adding the product to the reference reception quality. Note that a practical corrected reception quality calculation sequence is the same as the above reception gain calculation sequence using equations (7) and (8).

As described above, reference reception quality is corrected by a predetermined quality variation amount indicating a reception quality variation, and the resultant corrected reception quality is used as the reception quality of each stopped system in an intermittent operation period of interest. This makes it possible to effectively reflect variations in reception quality during a period in which each stopped system is stopped in total reception quality and to accurately follow up reception quality variations as compared with the case wherein past reception quality is used as the reception quality of each stopped system in the intermittent operation period of interest without any change.

In addition, since the difference between reception qualities obtained in the previous and second previous intermittent operation periods of a stopped system of interest is used as a quality variation amount, the variation tendency of reception quality in the stopped system of interest can be effectively reflected in total reception quality, thereby accurately following up reception quality variations.

[12th Embodiment]

A total reception quality calculation method in a reception diversity system according to the 12th embodiment of the present invention will be described next with reference to FIG. 13. Note that the arrangement and intermittent reception operation of the reception diversity system according to this embodiment are the same as those of the first embodiment (see FIG. 1) and those of the eighth embodiment (see FIG. 11), and a description thereof will be omitted.

The 11th embodiment described above has exemplified the case wherein the corrected reception quality obtained by correcting the reference reception quality with a quality variation amount is used as the reception quality of each stopped system in the intermittent operation period of interest.

In this embodiment, reference reception quality is corrected by the quality ratio between reception quality representing a new system which is operating in an intermittent operation period of interest and reception quality representing each stopped system which is stopped in the intermittent operation period of interest, and the resultant corrected reception quality is used as the reception quality of each stopped system in the intermittent operation period of interest.

Figure 13:
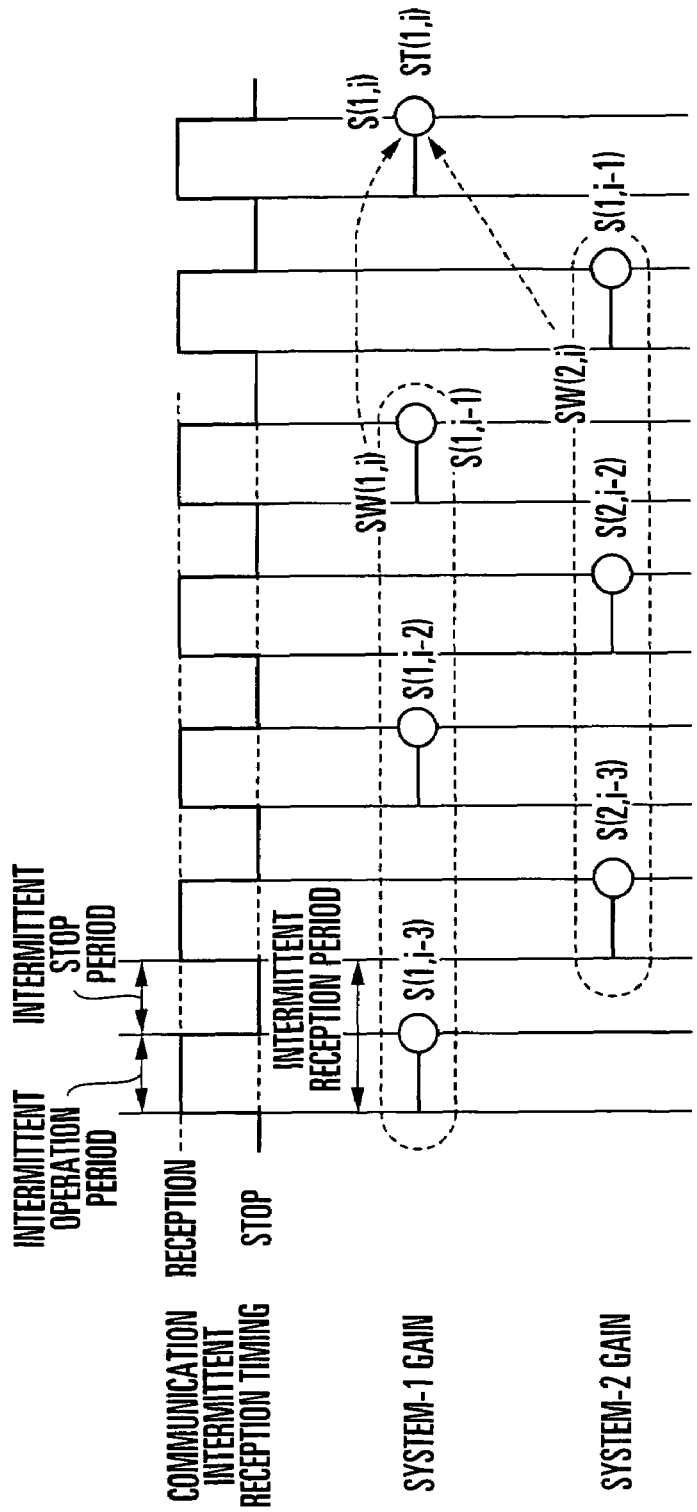
FIG. 13 is a chart for explaining a total reception quality calculation method in a reception diversity system according to the 12th embodiment of the present invention.

Referring to FIG. 13, as reference reception quality, the reception quality obtained of a new system in an intermittent operation period of interest is used. In addition, as reception quality representing the new system, cumulative reception quality of the system of interest is used, and the cumulative reception quality of the system is used as reception quality representing each stopped system. A quality ratio is calculated from these cumulative reception qualities is used.

For example, in an intermittent operation period corresponding to an intermittent operation number i in system 1 corresponding to the new system, reception quality S(1, i) obtained in the intermittent operation period of interest of system 1 is used as a reference reception quality. Let SW(1, i) be the cumulative reception quality of system 1, and SW(2, i) be the cumulative reception quality of system 2 corresponding to a stopped system. Corrected reception quality is obtained by multiplying the ratio of these cumulative reception qualities by the reference reception quality. This corrected reception quality is used as total reception quality ST(1, i).

Presented below as equations (12) and (13) are generalized equations for estimating an initial reception gain in this embodiment. In this case, ST( ) represents total reception quality; S( ), the reception quality of each system; W( ), a weight; SW( ), cumulative reception quality; n, a system number; i, an intermittent operation number in each system; H, a cumulative count of final set gains; and g, a variable indicating the cumulative count H.

$$ST(i) = 10 \times \log_{10}\{(1 + 10^{SW(2,i)-SW(1,i)}) \cdot 10^{S(1,i)/10}\} \quad (12)$$

$$SW(n, i) = 10 \times \log_{10} \sum_{g=1}^{H} \{10^{S(n,i-g)} \cdot W(n, -g)\} \quad (13)$$

As described above, reference reception quality is corrected by the quality ratio between reception quality in a new system which is operating in an intermittent operation period of interest and reception quality in each stopped system which is stopped in the intermittent operation period of interest, and the resultant corrected reception quality is used as reception quality in each stopped system in the intermittent operation period of interest. This makes it possible to effectively reflect variations in the reception quality in a period during which each stopped system is stopped and to accurately follow up reception quality variations as compared with a case wherein past reception quality is used as reception quality in each stopped system in the intermittent operation period of interest.

In addition, since the ratio between cumulative reception quality in a new system and cumulative reception quality in each stopped system is used as a quality ratio, even if any of the reception qualities greatly varies temporarily, the influence of the variation on the quality ratio can be suppressed, thereby realizing stable total reception quality estimation.

Furthermore, since the reception quality obtained in an intermittent operation period of interest of a new system is used as reference reception quality, reception quality in each stopped system can be estimated in consideration of the latest reception quality variations. Note that as reference reception quality, the reception quality obtained in the previous intermittent operation period of each stopped system may be used. This makes it possible to estimate reception quality in each stopped system in consideration of reception quality variations in each stopped system.

[13th Embodiment]

Figure 14:
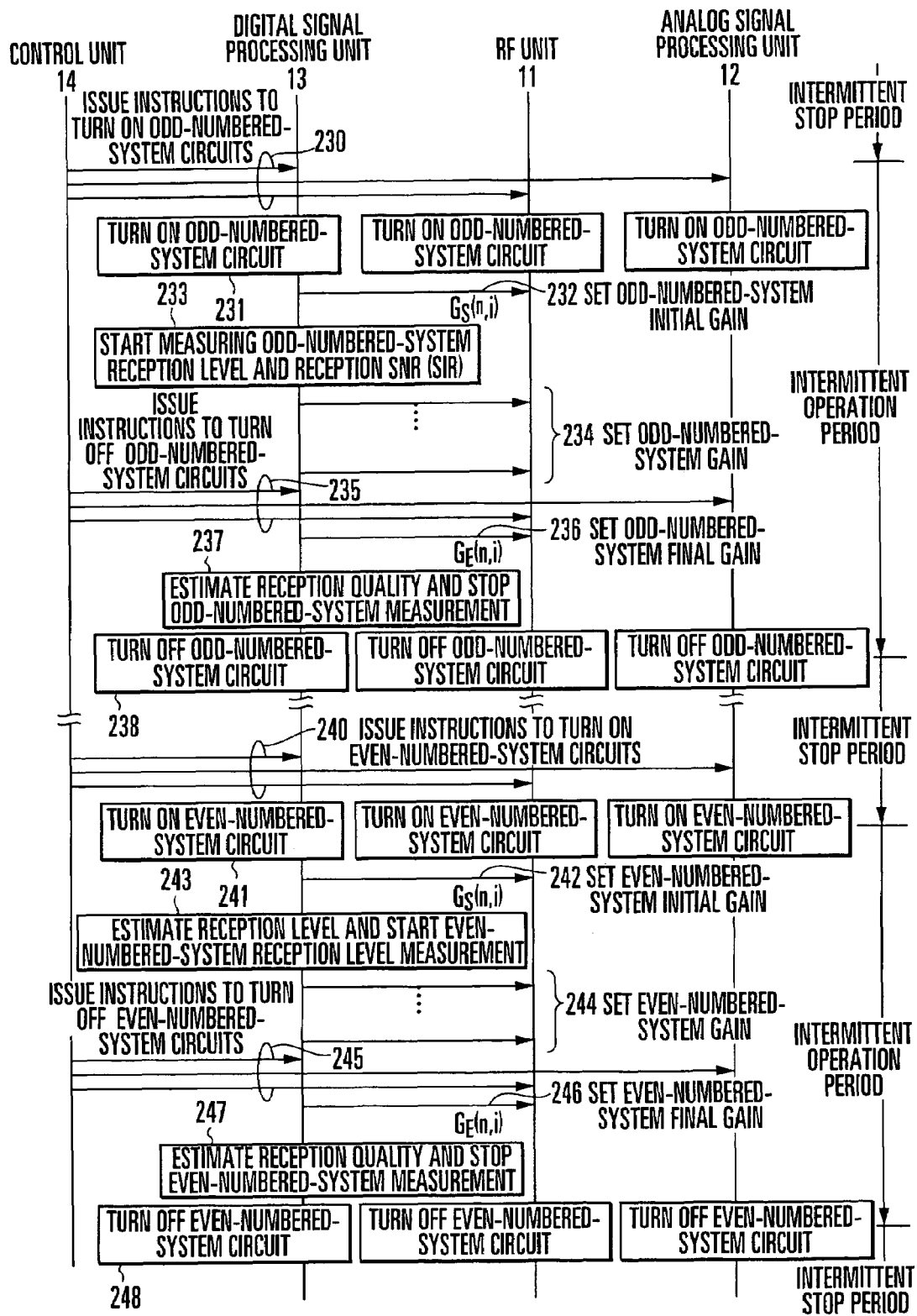
FIG. 14 is a view showing a sequence indicating the intermittent reception operation of a reception diversity system according to the 13th embodiment of the present invention.
Figure 15:
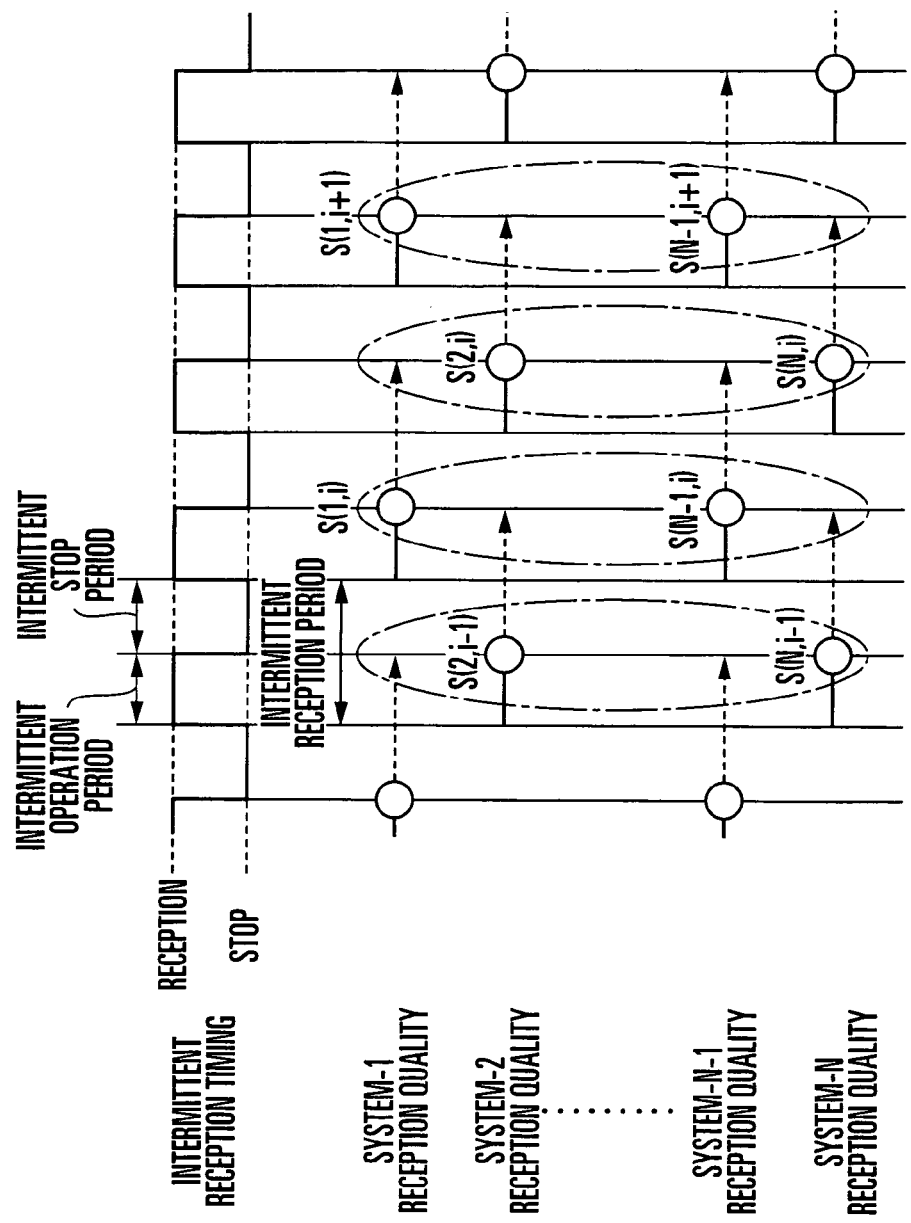
FIG. 15 is a chart for explaining a total reception quality calculation method in a reception diversity system according to the 13th embodiment of the present invention.

A reception diversity system according to the 13th embodiment of the present invention will be described next with reference to FIGS. 14 and 15. FIG. 14 shows a sequence indicating the intermittent reception operation of the reception diversity system according to the 13th embodiment of the present invention. FIG. 15 shows a reception gain calculation method in the reception diversity system according to the 13th embodiment of the present invention. The arrangement of the reception diversity system according to this embodiment is the same as that of the first embodiment described above (see FIG. 1), and a description thereof will be omitted.

Each of the eighth to 12th embodiments described above has exemplified the case wherein the control unit 14 performs intermittent reception operation in which only one of a plurality of systems is operated while the remaining systems are stopped as shown in FIG. 19 in, for example, a standby time during which the wireless terminal is not used for speech communication or communication.

In this embodiment, in intermittent reception operation, the respective systems are divided into system groups, and the respective groups are controlled such that in each intermittent operation period, only systems belonging to a predetermined system group of the respective groups are operated while systems belonging to the remaining system groups are stopped.

In the following description, the respective systems are divided into two system groups respectively including systems with odd and even systems, and the two systems are alternately operated.

Referring to FIG. 1, system-1 circuits 11A, 12A, and 13A are regarded as circuits of the odd-numbered system, and system-2 circuits 11B, 12B, and 13B are regarded as circuits of the even-numbered system.

First of all, a control unit 14 sends instructions to an RF unit 11, analog signal processing unit 12, and digital signal processing unit 13 to turn on, for example, the odd-numbered-system circuits 11A, 12A, and 13A, respectively, in accordance with the arrival of an odd-numbered-system intermittent operation period (step 230).

In response to these instructions, the RF unit 11, analog signal processing unit 12, and digital signal processing unit 13 respectively turn on the odd-numbered-system circuits 11A, 12A, and 13A to operate the respective circuits (step 231).

The digital signal processing unit 13 then causes the odd-numbered-system circuit 13A to set, in the odd-numbered-system circuit 11A of the RF unit 11, for example, the final set gain used in the immediately preceding intermittent operation period as the initial reception gain of the odd-numbered-system circuit 11A of the RF unit 11 (step.232).

This initial reception gain is obtained by the calculation method based on the first embodiment. However, the present invention is not limited to this, and an initial reception gain may be calculated by using another embodiment described above.

Subsequently, the digital signal processing unit 13 causes the odd-numbered-system circuit 13A to start measuring the reception level and reception quality of an odd-numbered-system digital reception signal received through the odd-numbered-system circuit 11A of the RF unit 11 and the odd-numbered-system circuit 12A of the analog signal processing unit 12 (step 233).

The odd-numbered-system circuit 13A calculates a gain to be set in the odd-numbered-system circuit 11A of the RF unit 11 on the basis of the level measurement result, and sets the gain in the odd-numbered-system circuit 11A of the RF unit 11. The odd-numbered-system circuit 13A repeatedly performs this operation in an intermittent operation period (step 234).

Subsequently, the control unit 14 sends instructions to the RF unit 11, analog signal processing unit 12, and digital signal processing unit 13 to turn off the odd-numbered-system circuits 11A, 12A, and 13A, respectively, in accordance with the arrival of an intermittent stop period of system 1 (step 235).

In accordance with this operation, the odd-numbered-system circuit 13A of the digital signal processing unit 13 stores/holds the final set gain set in the odd-numbered-system circuit 11A of the RF unit 11 in step 236. The odd-numbered-system circuit 13A also calculates total reception quality in the manner described later and stores/holds it, and stops reception level and reception quality measurement (step 237).

The RF unit 11, analog signal processing unit 12, and digital signal processing unit 13 then turn off the odd-numbered-system circuit 11A, 12A, and 13A to stop their operations (step 238).

The control unit 14 then sends instructions to the RF unit 11, analog signal processing unit 12, and digital signal processing unit 13 to turn on even-numbered-system circuits 11B, 12B, and 13B, respectively, in accordance with the arrival of an even-numbered-system intermittent operation period (step 240).

In accordance with the instructions, the RF unit 11, analog signal processing unit 12, and digital signal processing unit 13 turn on the even-numbered-system circuits 11B, 12B, and 13B, respectively, to operate them (step 241).

The digital signal processing unit 13 causes the even-numbered-system circuit 13B to set, in the even-numbered-system circuit 11B of the RF unit 11, an initial reception gain $G_S(n, i)$ estimated for each even-numbered system (n is an even number) from a final set gain $G_E(n, i)$ (n is an odd number) which was used for the previous operation by the even-numbered-system circuit 11B of the RF unit 11 (step 242).

The digital signal processing unit 13 then causes the even-numbered-system circuit 13B to start measuring the reception level and reception quality of the even-numbered-system digital reception signal received through the even-numbered-system circuit 11B of the RF unit 11 and the even-numbered-system circuit 12B of the analog signal processing unit 12 (step 243).

The even-numbered-system circuit 13B calculates a gain to be set in the even-numbered-system circuit 11B of the RF unit 11 on the basis of the level measurement result, and sets the gain in the even-numbered-system circuit 11B of the RF unit 11. The even-numbered-system circuit 13B repeatedly perform this operation in an intermittent operation period (step 244).

Subsequently, the control unit 14 sends instructions to the RF unit 11, analog signal processing unit 12, and digital signal processing unit 13 to turn off the even-numbered-system circuits 11B, 12B, and 13B, respectively, in accordance with the arrival of an even-numbered-system intermittent stop period (step 245).

In accordance with this operation, the even-numbered-system circuit 13B of the digital signal processing unit 13 stores/holds the final set gain set in the even-numbered-system circuit 11B of the RF unit 11 in step 246. The even-numbered-system circuit 13B also calculates total reception quality in the manner described later and stores/holds it, and stops reception level and reception quality measurement (step 247).

The RF unit 11, analog signal processing unit 12, and digital signal processing unit 13 then turn off the even-numbered-system circuits 11B, 12B, and 13B to stop their operations (step 248). The intermittent operation period then shifts to an intermittent stop period, and the above intermittent reception operation is repeatedly performed.

As for total reception quality, as reception quality in the intermittent operation period of each stopped system which is stopped in the intermittent operation period, the reception quality measured in the immediately preceding intermittent operation period of each stopped system is used, as in the ninth embodiment. As shown in FIG. 15, the reception quality measured in the system which is operating in the intermittent operation period is combined with the reception quality measured in the previous intermittent operation period of the system stopped in the intermittent operation period of interest to obtain total reception quality.

In this manner, in an intermittent reception operation, the respective systems are divided into a plurality of system groups, and only the systems belonging to a predetermined system group of the respective system groups are operated while the systems belonging to the remaining system groups are stopped in each intermittent operation period. This can shorten a period in which each system is stopped, even if the number of systems is large, as compared with the above case wherein the systems are operated one by one. This makes it possible to reduce reception quality variations in a period in which each system stops reception operation and to accurately follow up reception quality variations.

In addition, as reception quality in each stopped system, the reception quality obtained in the previous operation period of each stopped system is used. Therefore, the latest reception quality variations can be reflected in total reception quality by simple calculation processing, thereby accurately following up reception quality variations. In this case, as reception quality in each stopped system, arbitrary reception quality obtained in the past in each stopped system may be used.

Note that total reception quality used in this embodiment may be obtained by using each of the total reception quality calculation methods described in the eighth to 12th embodiments.

[14th Embodiment]

The intermittent reception operation of a reception diversity system according to the 14th embodiment of the present invention will be described next with reference to FIG. 16. The arrangement of the reception diversity system according to this embodiment is the same as that of the first embodiment described above (see FIG. 1), and a description thereof will be omitted.

Each embodiment described above has exemplified the case wherein a control unit 14 performs intermittent reception operation in which only one of a plurality of systems is operated while the remaining systems are stopped as shown in FIG. 19 in, for example, a standby time during which the wireless terminal is not used for speech communication or communication or the case wherein in an intermittent reception operation, the respective systems are divided into a plurality of system groups, and only the systems belonging to a predetermined system group of the respective system groups are operated while the systems belonging to the remaining system groups are stopped in each intermittent operation period.

In this embodiment, the control unit 14 operates a main system comprising one or more systems of the respective systems commonly in each intermittent operation period in intermittent reception operation, while alternately operating subsystems each comprising one or more systems other than the main system in each intermittent operation period.

Figure 16:
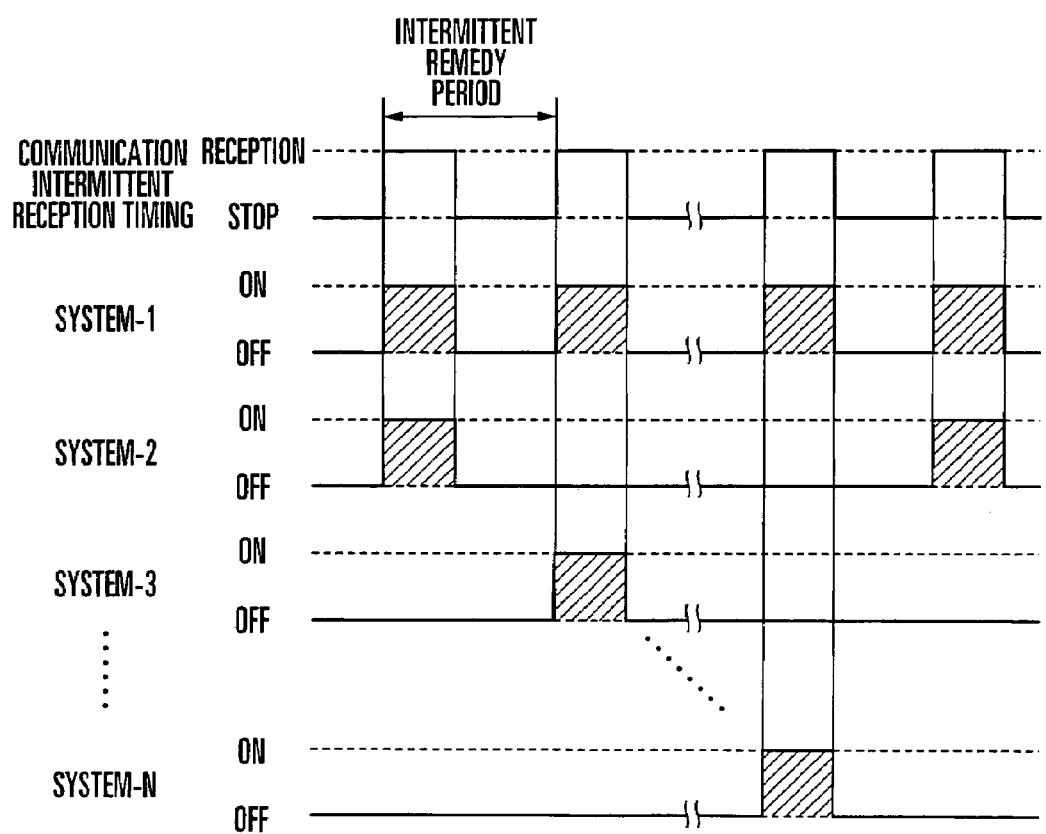
FIG. 16 is a timing chart showing the intermittent reception operation of a reception diversity system according to the 14th embodiment of the present invention.
Figure 17:
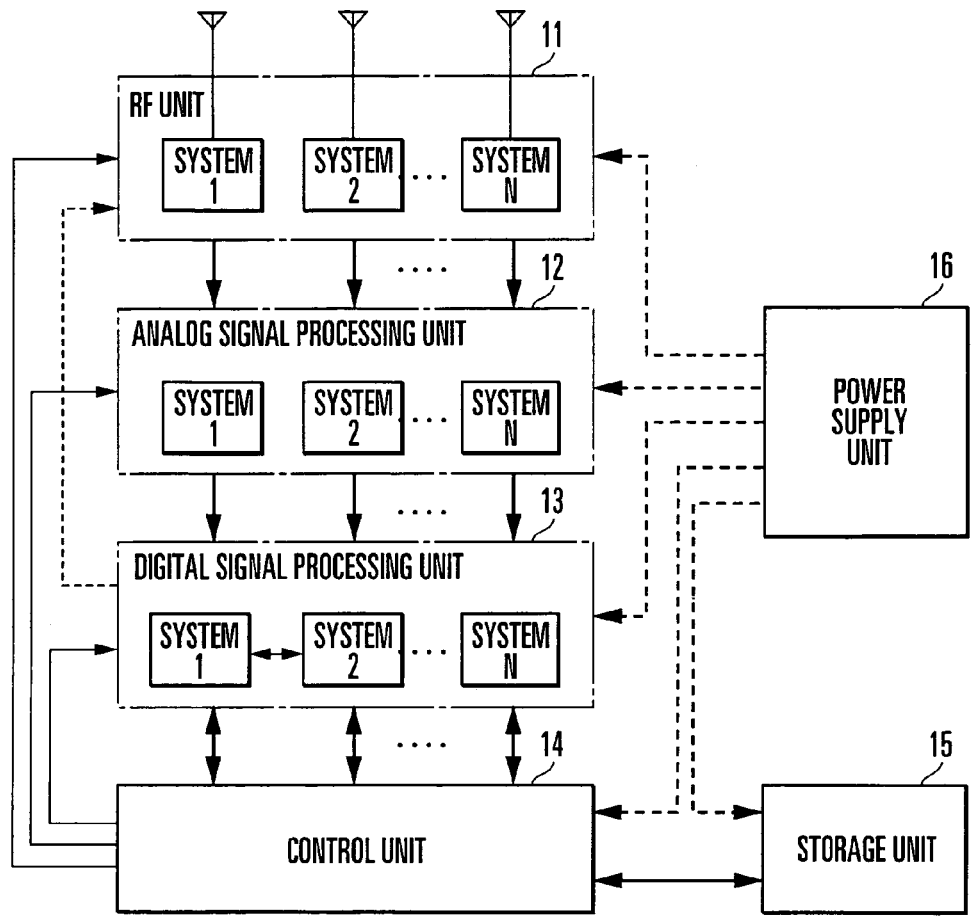
FIG. 17 is a block diagram showing the arrangement of a conventional reception diversity system.
Figure 18:
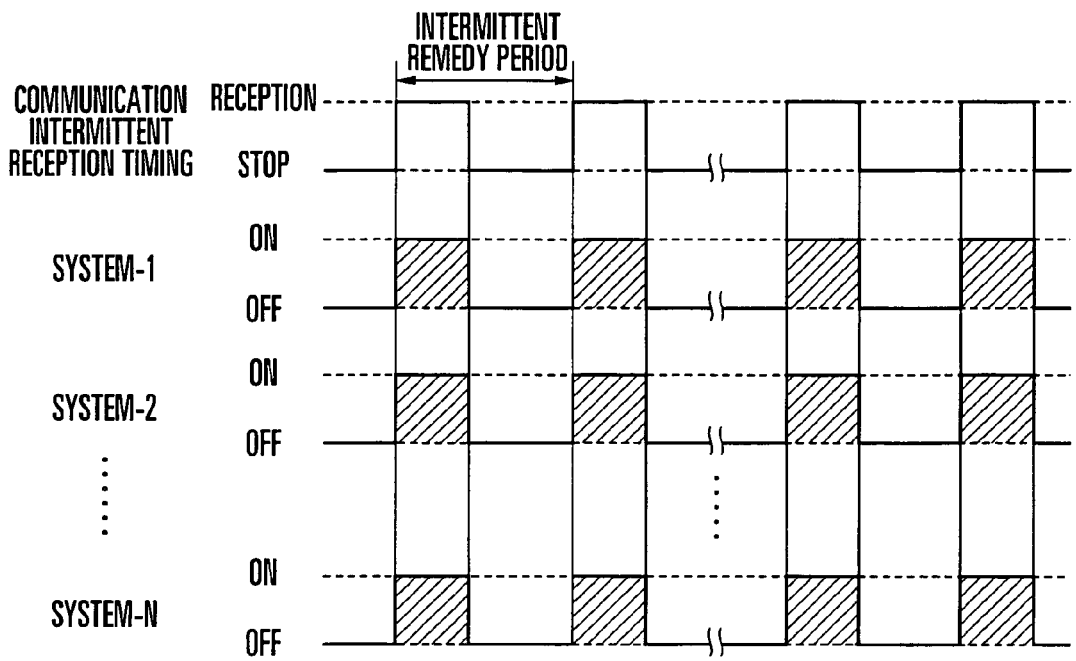
FIG. 18 is a timing chart showing an example of the intermittent reception operation of the reception diversity system.

Referring to FIG. 16, system 1 is a main system, which operates commonly in each intermittent operation period. Systems 2 to N are subsystems, one of which operates in each intermittent operation period.

In general, in a reception diversity system, antennas provided for the respective systems differ in antenna characteristics from each other in accordance with the mount positions of the antennas and their directions relative to a base station. This influences the communication characteristics of each system.

The antenna of a wireless terminal, e.g., a folding cellular phone terminal, greatly changes in direction depending on whether the terminal is folded or unfolded. As a consequence, the positional relationship between the base station and the antenna and that between the antenna and another antenna also change.

In this embodiment, since one of the respective systems is operated as a main system while the remaining systems are operated as subsystems, errors due to variations in reception gain and reception quality in an intermittent stop period in the main system can be suppressed. In addition, this makes it possible to accurately follow up reception level variations and accurately calculate total reception quality.

In addition, selecting a main system in accordance with the directions of the antenna which changes depending on the state of a wireless terminal, e.g., the folded/unfolded state of a folding cellular phone terminal, makes it possible to maintain good communication characteristics while suppressing an increase in current consumption due to the introduction of a reception diversity system.

[Extensibility of Each Embodiment]

When each of the above embodiments is to be applied, each embodiment may be combined with another embodiment. This allows to obtain the effects of the respective embodiments.

Each embodiment has exemplified the case wherein there are two systems or two system groups. However, the numbers of them are not limited to two. Each embodiment described above can be applied to a case wherein there are three or more systems or system groups, and similar functions and effects can be obtained.

In addition, each embodiment has exemplified the case wherein in the intermittent reception operation performed by the control unit 14, the respective system circuits of the RF unit 11, analog signal processing unit 12, and digital signal processing unit 13 are switched/controlled. However, the present invention is not limited to this. If any one of the RF unit 11, analog signal processing unit 12, and digital signal processing unit 13 performs switching control of system circuits, a reduction in power consumption can be achieved. Since it is an object of the present invention to effectively use the essential function required for the reception diversity system when system circuits are switched/controlled in intermittent reception operation, it suffices to set at least the system circuits of the RF unit 11 as switching control targets.

Each embodiment has exemplified the case wherein the final set gain finally set in an intermittent operation period of interest is used as a reception gain representing each intermittent operation period in an arbitrary system. However, the present invention is not limited to this. For example, an arbitrary reception gain used in the intermittent operation period of interest may be used as a representative reception gain. Alternatively, a statistics value calculated from a plurality of reception gains used in the intermittent operation period of interest or in a plurality of intermittent operation periods including an intermittent operation period preceding the period of interest may be used as a representative reception gain. In this case, as a statistics value, the above cumulative reception gain may be used, and values obtained by various kinds of statistical processing, e.g., a mean value, a median value, and a value calculated from a standard deviation, can be used.

According to the present invention, as an information reception gain in a new system which is operated in accordance with the arrival of an intermittent operation period, a reception gain calculated on the basis of the final reception gain used in a past intermittent operation period is used. Even if, therefore, the reception level varies while the system whose operation is resumed is stopped, the reception gain can be adjusted following up this reception level variation. This makes it possible to suppress power consumption in each system and avoid a reduction in time during which the wireless terminal can be operated on a secondary battery, e.g., speech communication time or standby time. In addition, this can maintain an essential function required for the reception diversity system, i.e., the follow-up function with respect to reception level variations in this case.

Furthermore, total reception quality is calculated, for each intermittent operation period, from reception quality in an intermittent operation period of interest which is obtained in a new system which has operated in the intermittent operation period of interest and reception quality which is obtained by estimation in each stopped system in the intermittent operation period of interest. Even if, therefore, systems are switched and operated in each intermittent operation period, the same total reception quality as that obtained when all the systems are concurrently operated can be obtained. This makes it possible to suppress power consumption in each system and avoid a reduction in time during which the wireless terminal can be operated on a secondary battery, e.g., speech communication time or standby time. In addition, this allows to properly execute an essential function required for the reception diversity system, e.g., reception control using total reception quality such as determination on cell switching in a wireless telephone system.

What is claimed is:

1. A reception diversity system comprising a wireless apparatus including
   an RF unit which amplifies radio waves respectively received by antennas with reception gains respectively set for systems and demodulates the radio waves to output analog reception signals,
   an analog signal processing unit which A/D-converts the respective analog reception signals from said RF unit for the respective systems and outputs the signals as digital reception signals,
   a digital signal processing unit which decodes and combines the respective digital reception signals from said analog signal processing unit to output desired reception information, sequentially adjusts a reception gain of each system in said RF unit on the basis of a reception level of each of the digital reception signals, and stores an arbitrary reception gain used for the adjustment, and
   a control unit which controls said RF unit, said analog signal processing unit, and said digital signal processing unit,
   wherein said control unit operates only a predetermined system of the respective systems while stopping the remaining systems for at least each intermittent operation period in intermittent reception operation of said RF unit, and stops all the systems in an intermittent stop period in the intermittent reception operation, and
   said digital signal processing unit sets, in said RF unit, an initial reception gain estimated from an arbitrary past reception gain used in a past intermittent operation period as a first reception gain in a new system which is operated in accordance with arrival of a next intermittent operation period,
   thereby performing switching control of a plurality of systems which respectively demodulate received radio waves, and obtaining desired reception data.

2. A system according to claim 1, wherein said digital signal processing unit uses, as the initial reception gain, a past reception gain used last in an intermittent operation period in which an arbitrary system has previously operated.

3. A system according to claim 1, wherein said digital signal processing unit uses, as the initial reception gain, an arbitrary past reception gain used in a system which has operated in an immediately preceding intermittent operation period.

4. A system according to claim 1, wherein said digital signal processing unit uses, as the initial reception gain, an arbitrary past reception gain used in the new system.

5. A system according to claim 1, wherein said digital signal processing unit uses, as the initial reception gain, a statistics value calculated from a plurality of past reception gains used in a past intermittent operation period.

6. A system according to claim 5, wherein said digital signal processing unit uses, as the statistics value, a cumulative reception gain obtained by performing predetermined weighting operation for a plurality of past reception gains used in the new system and totaling the gains.

7. A system according to claim 5, wherein said digital signal processing unit uses, as the statistics value, a cumulative reception gain obtained by performing predetermined weighting operation for a plurality of past reception gains used in a system which has operated in an immediately preceding intermittent operation period and totaling the gains.

8. A system according to claim 1, wherein said digital signal processing unit corrects a reference reception gain as a reference for estimation which is obtained from an arbitrary past reception gain by using a gain variation amount indicating a reception gain variation tendency, and uses the resultant corrected reception gain as the initial reception gain.

9. A system according to claim 8, wherein said digital signal processing unit uses, as the reference reception gain, cumulative reception gain obtained by predetermined weighting operation for a plurality of past reception gains used in the new system and totaling the gains.

10. A system according to claim 8, wherein said digital signal processing unit uses, as the gain variation amount, a difference between a reception gain, of reception gains in a system which has operated in an immediately preceding intermittent operation period, which represents a previous intermittent operation period in which the system has operated and a reception gain representing a second previous intermittent operation period in which the system has operated.

11. A system according to claim 8, wherein said digital signal processing unit uses, as the gain variation amount, a difference between a reception gain representing a previous intermittent operation period in which a system which has operated in an immediately preceding intermittent operation period has operated and a cumulative reception gain obtained by performing predetermined weighting operation for a plurality of past reception gains in the system and totaling the gains.

12. A system according to claim 1, wherein said digital signal processing unit corrects a reference reception gain as a reference for estimation which is obtained from an arbitrary past reception gain by adding a variation value obtained by multiplying a gain variation amount indicating a reception gain variation tendency by a predetermined coefficient, and uses the resultant corrected reception gain as the initial reception gain.

13. A system according to claim 12, wherein said digital signal processing unit uses, as the coefficient, a value which makes a variation width of the variation value become smaller than a variation width of the reference reception gain.

14. A system according to claim 12, wherein said digital signal processing unit uses, as the coefficient, a value which makes a variation width of the variation value become not less than a variation width of the reference reception gain.

15. A system according to claim 12, wherein said digital signal processing unit adaptively adjusts the value of the coefficient in accordance with an operation state of said wireless apparatus.

16. A system according to claim 1, wherein said digital signal processing unit corrects a reference reception gain as a reference for estimation which is obtained from an arbitrary past reception gain with a gain ratio between a reception gain representing the new system and a reception gain representing a system which has operated in an immediately preceding intermittent operation period, and uses the resultant corrected reception gain as the initial reception gain.

17. A system according to claim 1, wherein said control unit divides the respective systems into a plurality of system groups, and operates only systems belonging to a predetermined system group of the respective system groups in the intermittent operation period while stopping the systems belonging to the remaining systems.

18. A system according to claim 17, wherein said digital signal processing unit uses, as an initial reception gain in each system belonging to a new system group which is operated in accordance with arrival of a next intermittent operation period, an initial reception gain estimated from an arbitrary past reception gain used in each system belonging to a system group which has operated in an immediately preceding intermittent operation period.

19. A system according to claim 17, wherein said digital signal processing unit corrects a reference reception gain as a reference for an initial reception gain in a system of interest for each system of a new system group whose reception operation is to be resumed by using a predetermined gain variation amount indicating a reception gain variation, and uses the resultant corrected reception gain as an initial reception gain in each of the systems.

20. A reception diversity system comprising a wireless apparatus including
an RF unit which amplifies radio waves respectively received by antennas with reception gains respectively set for systems and demodulates the radio waves to output analog reception signals,
an analog signal processing unit which A/D-converts the respective analog reception signals from said RF unit for the respective systems and outputs the signals as digital reception signals,
a digital signal processing unit which decodes and combines the respective digital reception signals from said analog signal processing unit to output desired reception information, and sequentially adjusts a reception gain of each system in said RF unit on the basis of a reception level of each of the digital reception signals, and
a control unit which controls said RF unit, said analog signal processing unit, and said digital signal processing unit,
wherein said control unit operates only a predetermined system of the respective systems while stopping the remaining systems for at least each intermittent operation period in intermittent reception operation of said RF unit, and stop all the systems in an intermittent stop period in the intermittent reception operation, and
said digital signal processing unit calculates and stores reception quality in a new system of interest from a digital reception signal from the new system which has operated in the intermittent operation period of interest for each of the intermittent operation periods, and calculates total reception quality which is obtained when all the systems are operated from reception quality in the intermittent operation period of interest of the new system which is obtained by calculation and reception quality obtained by estimation in the intermittent operation period of interest of each stopped system, thereby performing switching control of a plurality of systems which respectively demodulate received radio waves, and obtaining desired reception data.

21. A system according to claim 20, wherein said digital signal processing unit uses, as reception quality in an intermittent operation period of interest of a stopped system of interest, arbitrary reception quality obtained in the past in the stopped system.

22. A system according to claim 20, wherein said digital signal processing unit uses, as reception quality in an intermittent operation period of interest of a stopped system of interest, reception quality obtained in a previous intermittent operation period in which the stopped system operated.

23. A system according to claim 20, wherein said digital signal processing unit uses, as reception quality in an intermittent operation period of interest of a stopped system of interest, reception quality in an intermittent operation period of interest of the new system.

24. A system according to claim 20, wherein said digital signal processing unit uses, as reception quality in an intermittent operation period of interest of a stopped system of interest, a statistics value calculated from a plurality of reception qualities obtained in the past in the new system.

25. A system according to claim 20, wherein said digital signal processing unit uses, as reception quality in an intermittent operation period of interest of a stopped system of interest, a statistics value calculated from a plurality of reception qualities obtained in the past in the stopped system.

26. A system according to claim 25, wherein said digital signal processing unit uses, as the statistics value, cumulative reception quality obtained by performing predetermined weighting operation for a plurality of reception qualities obtained in the past in the stopped system.

27. A system according to claim 20, wherein said digital signal processing unit corrects, by a quality variation amount indicating a reception quality variation tendency, a reference reception quality as a reference for estimation which is obtained from arbitrary past reception quality, and uses the resultant corrected reception quality as reception quality in an intermittent operation period of interest of a stopped system of interest.

28. A system according to claim 27, wherein said digital signal processing unit calculates the corrected reception quality from a sum of a variation value obtained by multiplying the reception quality variation amount by a predetermined coefficient and the reference reception quality.

29. A system according to claim 20, wherein said digital signal processing unit corrects, by using a quality ratio between reception quality representing the new system and reception quality representing the stopped system, a reference reception quality as a reference for estimation which is obtained from arbitrary past reception quality, and uses the resultant corrected reception quality as reception quality in an intermittent operation period of interest of a stopped system of interest.

30. A system according to claim 20, wherein said control unit controls the respective systems upon dividing the systems into a plurality of system groups, and operates only systems belonging to a predetermined system group of the respective system groups in each of the intermittent operation periods while stopping systems belonging to the remaining system group.

31. A system according to claim 1, wherein said control unit operates a main system including not less than any one of the respective systems commonly in each of the intermittent operation periods, and operates subsystems each including not less than any one of the systems other than the main system while switching the subsystems in each of the intermittent operation periods.

32. A system according to claim 20, wherein said control unit operates a main system including not less than any one of the respective systems commonly in each of the intermittent operation periods, and operates subsystems each including not less than any one of the systems other than the main system while switching the subsystems in each of the intermittent operation periods.

33. A system according to claim 31, wherein said control unit selects the main system in accordance with a direction of an antenna of each of the systems.

34. A system according to claim 31, wherein said wireless apparatus comprises a folding cellular phone terminal, and said control unit selects the main system in accordance with a folded/unfolded state of said cellular phone terminal.

35. A control method for a reception diversity system, which is used in a wireless apparatus, causes an analog signal processing unit to A/D-convert an analog reception signal for each system which is obtained, for each system, by causing an RF unit to amplify a radio wave received by each antenna and demodulating the radio wave, causes a digital signal processing unit to decode and combine the obtained digital reception signals to output desired reception information, and causes a control unit to perform switching control of each system in each intermittent operation period in intermittent reception operation, comprising:

the step of causing the control unit to operate only a predetermined system of the respective systems in each intermittent operation period in intermittent reception operation in at least the RF unit while stopping the remaining system, and stop all the systems in an intermittent stop period in the intermittent reception operation;

the step of causing the digital signal processing unit to sequentially adjust a reception gain in each system on the basis of a reception level of each of the digital reception signals and store an arbitrary reception gain used for the adjustment; and the step of causing the digital signal processing unit to set, in the RF unit, an initial reception gain estimated from an arbitrary past reception gain used in a past intermittent operation period as a first reception gain in a new system which is operated in accordance with arrival of a next intermittent operation period.

36. A method according to claim 35, wherein the digital signal processing unit uses, as the initial reception gain, a past reception gain used last in an intermittent operation period in which an arbitrary system has previously operated.

37. A method according to claim 35, wherein the digital signal processing unit uses, as the initial reception gain, an arbitrary past reception gain used in a system which has operated in an immediately preceding intermittent operation period.

38. A method according to claim 35, wherein the digital signal processing unit uses, as the initial reception gain, an arbitrary past reception gain used in the new system.

39. A method according to claim 35, wherein the digital signal processing unit uses, as the initial reception gain, a statistics value calculated from a plurality of past reception gains used in a past intermittent operation period.

40. A method according to claim 39, wherein the digital signal processing unit uses, as the statistics value, a cumulative reception gain obtained by performing predetermined weighting operation for a plurality of past reception gains used in the new system and totaling the gains.

41. A method according to claim 39, wherein the digital signal processing unit uses, as the statistics value, a cumulative reception gain obtained by performing predetermined weighting operation for a plurality of past reception gains used in a system which has operated in an immediately preceding intermittent operation period and totaling the gains.

42. A method according to claim 35, wherein the digital signal processing unit corrects a reference reception gain as a reference for estimation which is obtained from an arbitrary past reception gain by using a gain variation amount indicating a reception gain variation tendency, and uses the resultant corrected reception gain as the initial reception gain.

43. A method according to claim 42, wherein the digital signal processing unit uses, as the reference reception gain, cumulative reception gain obtained by predetermined weighting operation for a plurality of past reception gains used in the new system and totaling the gains.

44. A method according to claim 42, wherein the digital signal processing unit uses, as the gain variation amount, a difference between a reception gain, of reception gains in a system which has operated in an immediately preceding intermittent operation period, which represents a previous intermittent operation period in which the system has operated and a reception gain representing a second previous intermittent operation period in which the system has operated.

45. A method according to claim 42, wherein the digital signal processing unit uses, as the gain variation amount, a difference between a reception gain representing a previous intermittent operation period in which a system which has operated in an immediately preceding intermittent operation period has operated and a cumulative reception gain obtained by performing predetermined weighting operation for a plurality of past reception gains in the system and totaling the gains.

46. A method according to claim 35, wherein the digital signal processing unit corrects a reference reception gain as a reference for estimation which is obtained from an arbitrary past reception gain by adding a variation value obtained by multiplying a gain variation amount indicating a reception gain variation tendency by a predetermined coefficient, and uses the resultant corrected reception gain as the initial reception gain.

47. A method according to claim 46, wherein the digital signal processing unit uses, as the coefficient, a value which makes a variation width of the variation value become smaller than a variation width of the reference reception gain.

48. A method according to claim 46, wherein the digital signal processing unit uses, as the coefficient, a value which makes a variation width of the variation value become not less than a variation width of the reference reception gain.

49. A method according to claim 46, wherein the digital signal processing unit adaptively adjusts the value of the coefficient in accordance with an operation state of the wireless apparatus.

50. A method according to claim 35, wherein the digital signal processing unit corrects a reference reception gain as a reference for estimation which is obtained from an arbitrary past reception gain with a gain ratio between a reception gain representing the new system and a reception gain representing a system which has operated in an immediately preceding intermittent operation period, and uses the resultant corrected reception gain as the initial reception gain.

51. A method according to claim 35, further comprising the step of causing the control unit to divide the respective systems into a plurality of system groups and operate only systems belonging to a predetermined system group of the respective system groups in the intermittent operation period while stopping the systems belonging to the remaining systems.

52. A method according to claim 51, wherein the digital signal processing unit uses, as an initial reception gain in each system belonging to a new system group which is operated in accordance with arrival of a next intermittent operation period, an initial reception gain estimated from an arbitrary past reception gain used in each system belonging to a system group which has operated in an immediately preceding intermittent operation period.

53. A method according to claim 51, wherein the digital signal processing unit corrects a reference reception gain as a reference for an initial reception gain in a system of interest for each system of a new system group whose reception operation is to be resumed by using a predetermined gain variation amount indicating a reception gain variation, and uses the resultant corrected reception gain as an initial reception gain in each of the systems.

54. A control method for a reception diversity system, which is used in a wireless apparatus, causes an analog signal processing unit to A/D-convert an analog reception signal for each system which is obtained, for each system, by causing an RF unit to amplify a radio wave received by each antenna and demodulating the radio wave, causes a digital signal processing unit to decode and combine the obtained digital reception signals to output desired reception information, and causes a control unit to perform switching control of each system in each intermittent operation period in intermittent reception operation, comprising:

the step of causing the control unit to operate only a predetermined system of the respective systems in each intermittent operation period in intermittent reception operation in at least the RF unit while stopping the remaining system, and stop all the systems in an intermittent stop period in the intermittent reception operation;

the step of causing the digital signal processing unit to sequentially adjust a reception gain in each system on the basis of a reception level of each of the digital reception signals; and the step of causing the digital signal processing unit to calculate and store reception quality, for each of the intermittent operation periods, in a new system which is operated in an intermittent operation period of interest from a digital reception signal in the new system and calculate total reception quality, which is obtained when all the systems are operated, from reception quality in the intermittent operation period of interest of the new system which is obtained by the calculation and reception quality obtained by estimation in the intermittent operation period of interest of each of the remaining stopped systems.

55. A method according to claim 54, wherein the digital signal processing unit uses, as reception quality in an intermittent operation period of interest of a stopped system of interest, arbitrary reception quality obtained in the past in the stopped system.

56. A method according to claim 54, wherein the digital signal processing unit uses, as reception quality in an intermittent operation period of interest of a stopped system of interest, reception quality obtained in a previous intermittent operation period in which the stopped system operated.

57. A method according to claim 54, wherein the digital signal processing unit uses, as reception quality in an intermittent operation period of interest of a stopped system of interest, reception quality in an intermittent operation period of interest of the new system.

58. A method according to claim 54, wherein the digital signal processing unit uses, as reception quality in an intermittent operation period of interest of a stopped system of interest, a statistics value calculated from a plurality of reception qualities obtained in the past in the new system.

59. A method according to claim 54, wherein the digital signal processing unit uses, as reception quality in an intermittent operation period of interest of a stopped system of interest, a statistics value calculated from a plurality of reception qualities obtained in the past in the stopped system.

60. A method according to claim 59, wherein the digital signal processing unit uses, as the statistics value, cumulative reception quality obtained by performing predetermined weighting operation for a plurality of reception qualities obtained in the past in the stopped system.

61. A method according to claim 54, wherein the digital signal processing unit corrects, by a quality variation amount indicating a reception quality variation tendency, a reference reception quality as a reference for estimation which is obtained from arbitrary past reception quality, and uses the resultant corrected reception quality as reception quality in an intermittent operation period of interest of a stopped system of interest.

62. A method according to claim 61, wherein the digital signal processing unit calculates the corrected reception quality from a sum of a variation value obtained by multiplying the reception quality variation amount by a predetermined coefficient and the reference reception quality.

63. A method according to claim 54, wherein the digital signal processing unit corrects, by using a quality ratio between reception quality representing the new system and reception quality representing the stopped system, a reference reception quality as a reference for estimation which is obtained from arbitrary past reception quality, and uses the resultant corrected reception quality as reception quality in an intermittent operation period of interest of a stopped system of interest.

64. A method according to claim 54, further comprising the step of causing the control unit to control the respective systems upon dividing the systems into a plurality of system groups and operate only systems belonging to a predetermined system group of the respective system groups in each of the intermittent operation periods while stopping systems belonging to the remaining system group.

65. A method according to claim 35, further comprising the step of causing the control unit to operate a main system including not less than any one of the respective systems commonly in each of the intermittent operation periods and operate subsystems each including not less than any one of the systems other than the main system while switching the subsystems in each of the intermittent operation periods.

66. A method according to claim 54, further comprising the step of causing the control unit to operate a main system including not less than any one of the respective systems commonly in each of the intermittent operation periods and operate subsystems each including not less than any one of the systems other than the main system while switching the subsystems in each of the intermittent operation periods.

67. A method according to claim 65, further comprising the step of causing the control unit to select the main system in accordance with a direction of an antenna of each of the systems.

68. A method according to claim 65, wherein the wireless apparatus comprises a folding cellular phone terminal, and
the method further comprises the step of causing the control unit to select the main system in accordance with a folded/unfolded state of the cellular phone terminal.

* * * * *